(12) United States Patent
Al-Saadi

(10) Patent No.: US 12,551,228 B2
(45) Date of Patent: Feb. 17, 2026

(54) MECHANICALLY OPERATED DEVICE

(71) Applicant: Hassan Al-Saadi, Point Cook (AU)

(72) Inventor: Hassan Al-Saadi, Point Cook (AU)

(73) Assignee: Hassan Al-Saadi (AU)

( * ) Notice: Subject to any disclaimer, the term of this patent is extended or adjusted under 35 U.S.C. 154(b) by 78 days.

(21) Appl. No.: 18/622,164

(22) Filed: Mar. 29, 2024

(65) Prior Publication Data
US 2024/0315719 A1   Sep. 26, 2024

Related U.S. Application Data

(63) Continuation-in-part of application No. PCT/AU2022/051175, filed on Oct. 3, 2022.

(30) Foreign Application Priority Data

Oct. 1, 2021 (AU) ............................... 2021903150

(51) Int. Cl.
*A61B 17/29* (2006.01)
(52) U.S. Cl.
CPC ... *A61B 17/2909* (2013.01); *A61B 2017/2911* (2013.01)
(58) Field of Classification Search
CPC ....... A61B 17/29; A61B 17/28; A61B 17/282; A61B 17/2909; A61B 2017/2911; A61B 2017/2926
See application file for complete search history.

(56) References Cited

U.S. PATENT DOCUMENTS

| | | |
|---|---|---|
| 2011/0022078 A1 | 1/2011 | Hinman |
| 2012/0277762 A1 | 11/2012 | Lathrop et al. |
| 2013/0144306 A1 | 6/2013 | Stefanchik et al. |
| 2016/0113732 A1 | 4/2016 | Steege et al. |
| 2017/0071693 A1* | 3/2017 | Taylor ........................ B25J 9/08 |
| 2020/0237466 A1 | 7/2020 | Lee et al. |
| 2020/0360038 A1 | 11/2020 | Yuan et al. |
| 2020/0405408 A1* | 12/2020 | Shelton, IV ........... A61B 34/30 |

* cited by examiner

*Primary Examiner* — Vi X Nguyen
(74) *Attorney, Agent, or Firm* — Thorpe North & Western, LLP

(57) ABSTRACT

A mechanically operated device and methods of use thereof. The mechanically operated device (10) has a handle assembly (15) sized and shaped for grasping by a user and an effector assembly (20). The effector assembly (20) includes a first primary actuator (225) tiltable about a first point, a second primary actuator (230) tiltable about a second point, and a tubular member (35). The tubular member (35) has a first end (40) positioned proximal to the second primary actuator (230). A flexible kinematic chain (50) is positioned at a second end (45) of the tubular member (35). A plurality of primary connecting cables (255) are coupled to the second primary actuator (230) and at least a first part of the flexible kinematic chain (50).

14 Claims, 28 Drawing Sheets

MECHANICALLY OPERATED DEVICE

PRIORITY CLAIM

This application is a continuation-in-part of Patent Cooperation Treaty Application Serial No. PCT/AU2022/051175, filed on Oct. 3, 2022, which claims the benefit of Australian Patent Application Serial No. 2021903150, filed Oct. 1, 2021, each of which is incorporated herein by reference in their entirety.

FIELD OF THE INVENTION

The present invention relates to a mechanically operated device and methods of use thereof. The mechanically operated device is particularly useful for manipulating articles in an environment having restricted access.

The invention relates particularly to a device for use in minimal invasive surgery with improved capacity for manipulation and degrees of movement. The invention, is, however, not limited to that use.

The invention has been developed primarily for use in minimally invasive surgical procedures to improved dexterity and ability to perform complex procedures. The invention and will be described hereinafter with reference to this application. It will be appreciated that the invention is not limited to this field of use.

BACKGROUND OF THE INVENTION

The introduction of minimally invasive surgery was a major development in the surgical field and currently is the international standard of care for most surgical procedures.

Devices used for minimally invasive surgery are, however, basic with limited degrees of freedom and lack of articulation. This shortcoming makes complex manipulation time consuming and difficult. It also requires a considerable period of training to be able to perform what is usually a simple task using traditional open procedure hand tools.

Some attempts have been made to address the shortcomings of devices used for minimally invasive surgery. One approach has been to develop and introduce surgical robots. Surgical robots address aspects of dexterity and degree of freedom of movement but have their own challenges:
- a specially equipped surgical theatre is required to accommodate the large size and multiple components of the device;
- surgical robots are expensive;
- surgical robots have limited availability;
- a limited number of trained surgeons have been trained to use surgical robots;
- a limited number of procedures that would be considered as complex enough to warrant the high expense of using a surgical robot;
- little to no difference in patient outcomes comparing surgical robots to standard procedures; and
- a significant longer procedure time, i.e., longer operating time and exposure to anaesthesia.

Although surgical robots will always have a role in surgical field, due to the above, it is unlikely that they will be a mainstream standard of care for performing surgical procedures in the foreseeable future. Accordingly, there is a need for a mechanically operated surgical instrument that is useful in minimally invasive surgery.

While numerous instrument structures have been proposed to address issues with minimally invasive surgery, such instruments typically possess limited degrees of freedom. Such instruments are also awkward to use as a user's movement(s) required to produce a desired effect is/are counterintuitive to usual hand movements.

Known instruments include a form of bracelet structure designed to be worn on a user's wrist however this means that an instrument needs to be clipped on for use and unclipped when a surgeon needs to use a different implement. This causes interference with the flow of movement of a surgeon performing a procedure. In addition, movement must be exaggerated at the wrist or forearm to achieve desired movement of the instrument.

It would be advantageous to have a mechanically operated instrument that improves the degrees of freedom of movement and provide a user with improved intuitive control.

The present invention seeks to provide an improved device and method of treatment, which will overcome or ameliorate at least one or more of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF INVENTION

The present invention provides a mechanically operated device configured such that motion of a user's hand is mimicked, and not mirrored, by motion of an end effector, and methods of use of such a mechanically operated device. A person skilled in the art will appreciate that while not limited to this use, the mechanically operated device and methods of use thereof will be particularly useful in minimally invasive surgical procedures.

According to an aspect of the present invention, there is provided a mechanically operated device comprising: a handle assembly sized and shaped for grasping by a user; an effector assembly, the effector assembly including: a first primary actuator tiltable about a first point; a second primary actuator tiltable about a second point; a tubular member, the tubular member having a first end positioned proximal to the second primary actuator; a flexible kinematic chain, the flexible kinetic chain positioned at a second end of the tubular member; and a plurality of primary connecting cables coupled to the second primary actuator and at least a first part of the kinematic chain, each primary connecting cable guided at least though a lumen of the tubular member and at least partially through the flexible kinematic chain; wherein the first primary actuator is configured to displace the second primary actuator thereby to impart translational motion to each primary connecting cable and, in use, reciprocally displace at least one primary connecting cable along a longitudinal axis of the at least one primary connecting cable and thereby enable movement of the at least first part of the flexible kinematic chain.

According to an embodiment, a primary gyroscope having a primary inner gimbal; a primary middle gimbal; and a primary outer gimbal may be rotatable relative to and adjacent the second primary actuator.

According to another embodiment, the primary outer gimbal may be rotatably mounted to the primary middle gimbal; and the primary middle gimbal may be rotatably mounted to the primary inner gimbal.

According to another embodiment, the primary inner gimbal, primary middle gimbal, and the primary outer gimbal may rotate in two orthogonal directions.

According to another embodiment, the primary inner gimbal may be configured to engage the first end of the tubular member.

According to another embodiment, the first primary actuator may rotatably engage the second primary actuator.

According to another embodiment, the effector assembly may further include: a first secondary actuator tiltable about a third point; a second secondary actuator tiltable about a fourth point; a plurality of secondary connecting cables coupled to the second secondary actuator and at least a second part of the kinematic chain, each secondary connecting cable guided at least though the lumen of the tubular member and the at least second part of the flexible kinematic chain; and wherein the first secondary actuator may be configured to displace the second secondary actuator thereby to impart translational motion to each secondary connecting cable and, in use, reciprocally displace at least one secondary connecting cable along a longitudinal axis of the at least one secondary connecting cable and thereby enable movement of the at least second part of the flexible kinematic chain.

According to another embodiment, a secondary gyroscope having a secondary inner gimbal; a secondary middle gimbal; and a secondary outer gimbal may be rotatable relative to and adjacent the second secondary actuator.

According to another embodiment, the secondary outer gimbal may be rotatably mounted to the secondary middle gimbal; and the secondary middle gimbal may be rotatably mounted to the secondary inner gimbal.

According to another embodiment, the secondary inner gimbal, secondary middle gimbal, and the secondary outer gimbal may rotate in two orthogonal directions.

According to another embodiment, the first secondary actuator may rotatably engage the second secondary actuator.

According to another embodiment, the handle assembly may be configured to rotate about a longitudinal axis of the handle assembly.

According to another embodiment, the effector assembly may be configured to rotate about a longitudinal axis of the effector assembly.

According to another embodiment, the longitudinal axis of the handle assembly and longitudinal axis of the effector assembly may be substantially identical.

According to another embodiment, the handle assembly may be operatively coupled to the effector assembly.

According to another embodiment, the handle assembly may include a driver, and the effector assembly may include a follower, the driver may be operatively coupled to the follower such that, in use, rotational motion of the handle assembly about the first longitudinal axis may be transmitted to the effector assembly thereby to effect rotational motion of the effector assembly about the longitudinal axis of the effector assembly.

According to another embodiment, the driver and the follower may be operatively coupled by a belt.

According to another embodiment, the driver and the follower may be gears.

According to another embodiment, the driver and the follower may be operatively coupled by a toothed belt.

According to another embodiment, the driver and the follower may be operatively coupled by a worm.

According to another embodiment, the driver and the follower are operatively coupled by a helical gear.

According to another embodiment, the mechanically operated device may further comprise an end effector coupled to a distal end of the kinematic chain.

According to another embodiment, the handle assembly may rotatably engage an end effector controller.

According to another embodiment, the end effector controller may be operatively coupled to the end effector.

According to another embodiment, the end effector controller may be configured to be engaged by at least part of a hand of the user.

According to another embodiment, the end effector controller may be a scissor-handle-type mechanism located adjacent the handle assembly; and the end effector may include at least one grasping formation; the scissor-handle-type mechanism may be operatively coupled to the end effector such that, in use, movement of the scissor-handle-type mechanism may effect a corresponding relative movement of the at least one grasping formation.

According to another embodiment, the scissor-handle-type mechanism may include at least one handle actuator having at least one handle actuator drive element; the end effector may include at least one grasping formation having at least one grasping formation drive element; at least one loop of flexible material: may pass at least partially over the at least one handle actuator drive element; may extend from the at least one handle actuator drive element through at least the lumen of the tubular member and through the flexible kinematic chain; and may pass at least partially over the at least one grasping formation drive element; wherein, the at least one loop of flexible material may be configured, in use: to transmit a first force generated by a movement of the at least one handle actuator drive element from a first position of the at least one handle actuator drive element to a second position of the at least one handle actuator drive element to the at least one grasping formation drive element such that, in use, a second force may be transmitted to the at least one grasping formation drive element thereby to move the at least one grasping formation from a first position of the at least one grasping formation to a second position of the at least one grasping formation.

According to another embodiment, the scissor-handle-type mechanism may include: a first handle actuator having a first handle actuator drive element; a second handle actuator having a second handle actuator drive element; the end effector may include: a first grasping formation having a first grasping formation drive element; a second grasping formation having a second grasping formation drive element; a first loop of flexible material: passes at least partially over the first handle actuator drive element; extends from the first handle actuator drive element through at least the lumen of the tubular member and through the flexible kinematic chain; and passes at least partially over the first grasping formation drive element; a second loop of flexible material: passes at least partially over the second handle actuator drive element; extends from the second handle actuator drive element through at least the lumen of the tubular member and through the flexible kinematic chain; and passes at least partially over the second grasping formation drive element; wherein, the first loop of flexible material may be configured, in use: to transmit a first force generated by a movement of the first handle actuator drive element from a first position of the first handle actuator drive element to a second position of the first handle actuator drive element to the first grasping formation drive element such that, in use, a second force is transmitted to the first grasping formation drive element thereby to move the first grasping formation from a first position of the first grasping formation to a second position of the first grasping formation; and wherein, the second loop of flexible material may be configured, in use: to transmit a first force generated by a movement of the second handle actuator drive element from a first position of the second handle actuator drive element to a second position of the second handle actuator drive element to the second grasping formation drive element such that, in use, a second force is transmitted to the second grasping formation drive element thereby to move the second grasping formation from a first position of the second grasping formation to a second position of the second grasping formation.

According to another embodiment, the mechanically operated device may further comprise: at least one handle assembly shaft movably disposed within the handle assembly; at least one effector assembly shaft movably disposed within the effector assembly; a coupler in coupling engagement the at least one handle assembly shaft and the at least one effector assembly shaft; wherein the at least one handle assembly shaft, at least one effector assembly shaft, and the scissor-handle-type mechanism may be configured such that, in use: opening the scissor-handle-type mechanism into an open position may bias the at least one handle assembly shaft, the coupler, and the at least one effector assembly shaft each into a first position; and closing the scissor-handle-type mechanism into a closed position may bias the at least one handle assembly shaft, the coupler, and at least one effector assembly shaft each into a second position, and wherein the at least one effector assembly shaft and the grasping assembly are operatively coupled such that, in use, when the at least one effector assembly shaft is biased into the first position, the grasping assembly is biased into an open releasing configuration; and when the at least one effector assembly shaft is biased into the second position, the grasping assembly is biased into a closed grasping configuration.

According to another embodiment, the end effector controller may be a trigger mechanism located adjacent the handle assembly; the at least one handle assembly shaft is movably disposed within the handle assembly; the at least one effector assembly shaft is movably disposed within the effector assembly; the end effector may comprise a grasping assembly, the grasping assembly may include at least one mobile grasping formation, and wherein the at least one handle assembly shaft, at least one effector assembly shaft, and trigger mechanism may be configured such that, in use: moving the trigger mechanism into a first position may bias the at least one handle assembly shaft, the coupler, and the at least one effector assembly shaft each into a first position; and moving the trigger mechanism into a second position may bias the at least one handle assembly shaft, the coupler, and at least one effector assembly shaft each into a second position, and wherein the at least one effector assembly shaft and the grasping assembly may be operatively coupled such that, in use, when the at least one effector assembly shaft is biased into the first position, the grasping assembly is biased into an open releasing configuration; and when the at least one effector assembly shaft is biased into the second position, the grasping assembly is biased into a closed grasping configuration.

According to another embodiment, the mechanically operated device may further comprise: a scissor-handle-type mechanism may be located adjacent the handle assembly; at least one handle assembly shaft may be movably disposed within the handle assembly; at least one effector assembly shaft may be movably disposed within the effector assembly; the end effector may comprise a grasping assembly, the grasping assembly includes at least one mobile grasping formation, and wherein the at least one handle assembly shaft, at least one effector assembly shaft, and the scissor-handle-type mechanism may be configured such that, in use: opening the scissor-handle-type mechanism into an open position may bias the at least one handle assembly shaft, the coupler, and the at least one effector assembly shaft each into a first position; and closing the scissor-handle-type mechanism into a closed position may bias the at least one handle assembly shaft, the coupler, and at least one effector assembly shaft each into a second position, and wherein the at least one effector assembly shaft and the grasping assembly may be operatively coupled such that, in use, when the at least one effector assembly shaft is biased into the first position, the grasping assembly is biased into an open releasing configuration; and when the at least one effector assembly shaft is biased into the second position, the grasping assembly is biased into a closed grasping configuration.

According to another aspect of the present invention, there is provided a mechanically operated device including: a handle assembly sized and shaped for grasping by a user; an effector assembly, the effector assembly including: a first actuator tiltable about a first point; a second actuator tiltable about a second point, a tubular member, the tubular member having a first end positioned proximal to the second actuator; a flexible kinematic chain, the flexible kinematic chain positioned at a second end of the tubular member; a plurality of connecting cables coupled to the second actuator and the kinematic chain, each connecting cable guided though a lumen of the tubular member and the flexible kinematic chain; and wherein the first actuator is configured to displace the second actuator thereby to impart translational motion to each connecting cable and, in use, reciprocally displace at least one connecting cable along a longitudinal axis and thereby enable movement of the flexible kinematic chain.

Preferably, the kinematic chain may include an assembly of bodies connected such that a desired motion may be provided. In a preferred embodiment, the bodies may be rigid. In yet another preferred embodiment, the bodies may be connected by one or more joint(s).

Preferably, each connecting cable may be a several strands of a material twisted or braided together. Further preferably, each connecting cable may be compliant in bending, compression, and/or torsion.

A person skilled in the art will also appreciate that the term "coupled," as used herein, is not limited to a direct connection between two components.

The mechanically operated device of the first aspect of the invention may include a variety of configurations and features. Preferably, the handle assembly may be configured to rest in the user's hand without requiring attachment to the user, i.e., there is no need for the handle assembly to be attached to the user's hand, wrist, forearm, upper arm, or shoulder. As such, the user can freely grasp the handle assembly in a comfortable manner as desired during use of the mechanically operated device.

In a preferred embodiment, a gyroscope having an inner gimbal, a middle gimbal, and an outer gimbal may be rotatable relative to and adjacent the second actuator.

In another preferred embodiment, the outer gimbal may be rotatably mounted to the middle gimbal and the middle gimbal may be rotatably mounted to the inner gimbal.

In another preferred embodiment, the inner gimbal, middle gimbal, and the outer gimbal may rotate in two orthogonal directions.

In yet another preferred embodiment, the inner gimbal may be configured to engage the first end of the tubular member.

In yet another preferred embodiment, the first actuator may rotatably engage the second actuator.

In yet another preferred embodiment, the handle assembly may be configured to rotate about a first longitudinal axis.

In yet another preferred embodiment, the effector assembly may be configured to rotate about a second longitudinal axis.

In yet another preferred embodiment, the handle assembly may be operatively coupled to the effector assembly.

In yet another preferred embodiment, the handle assembly may include a driver and the effector assembly may include a follower, the driver may be operatively coupled to the follower such that, in use, rotational motion of the handle assembly about the first longitudinal axis may be transmitted to the effector assembly thereby to effect rotational motion of the effector assembly about the second longitudinal axis.

In yet another preferred embodiment, the driver and the follower may be operatively coupled by a belt.

In yet another preferred embodiment of the first aspect, the driver and the follower may be gears.

In yet another preferred embodiment, the driver and the follower may be operatively coupled by a toothed belt.

In yet another preferred embodiment, the driver and the follower may be operatively coupled by a worm.

In yet another preferred embodiment, the driver and the follower may be operatively coupled by a helical gear.

In yet another preferred embodiment, the mechanically operated device may include an end effector coupled to a distal end of the kinematic chain.

In yet another preferred embodiment, the handle assembly may rotatably engage an end effector controller.

In yet another preferred embodiment, the end effector controller may be operatively coupled to the end effector.

In yet another preferred embodiment, the end effector controller may be configured to be held by a hand of the user.

In yet another preferred embodiment, the end effector controller may include a scissor-handle-type mechanism. It will be appreciated that configurations other than a scissor-handle-type mechanism may be used and are contemplated as suitable. Such configurations may include, for example, a trigger mechanism.

In yet another preferred embodiment, the mechanically operated device may include: at least one handle assembly shaft movably disposed within the handle assembly; at least one effector assembly shaft movably disposed within the effector assembly; a coupler configured to freely rotatably operatively couple each of at least one handle assembly shaft and the at least one effector assembly shaft; and the end effector comprising a grasping assembly, the grasping assembly including at least two mobile jaws, and wherein the at least one handle assembly shaft, the at least one effector assembly shaft, and the scissor-handle-type mechanism may be configured such that, in use: opening the scissor-handle-type mechanism into an open position may bias the at least one handle assembly shaft, the coupler, and the at least one effector assembly shaft each into a first position; and closing the scissor-handle-type mechanism into a closed position may bias the at least one handle assembly shaft, the coupler, and the at least one effector assembly shaft each into a second position, and wherein the at least one effector assembly shaft and the grasping assembly may be operatively coupled such that, in use, when the at least one effector assembly shaft is biased into the first position, the grasping assembly will be biased into an open releasing configuration; and when the at least one effector assembly shaft is biased into the second position, the grasping assembly will be biased into a closed grasping configuration.

In yet another preferred embodiment, the mechanically operated device may include at least one handle assembly shaft movably disposed within the handle assembly, at least one handle assembly shaft including toothed formations; at least one effector assembly shaft movably disposed within the effector assembly, the at least one effector assembly shaft may include a first gear at a first end and a second gear at a second end; a coupling mechanism configured to meshingly engage each of the toothed formations of the at least one handle assembly shaft and the first gear of the at least one effector assembly shaft; and the end effector may include: an end effector gear configured to meshingly engage the second gear of the at least one effector assembly shaft; and a grasping assembly, the grasping assembly may include at least two mobile jaws, and wherein the at least one handle assembly shaft, the at least one effector assembly shaft, and the scissor-handle-type mechanism may be configured such that, in use: opening the scissor-handle-type mechanism into an open position may bias the at least one handle assembly shaft, the coupling mechanism, and the at least one effector assembly shaft each into a first position; and closing the scissor-handle-type mechanism into a closed position may bias the at least one handle assembly shaft, the coupling mechanism, and the at least one effector assembly shaft each into a second position, and wherein the at least one effector assembly shaft and the grasping assembly may be operatively coupled such that, in use, when the at least one effector assembly shaft is biased into the first position, the grasping assembly will be biased into an open releasing configuration; and when the at least one effector assembly shaft is biased into the second position, the grasping assembly will be biased into a closed grasping configuration.

In yet another preferred embodiment, the coupling mechanism may include: a coupling gear configured to meshingly engage the toothed formation of the at least one handle assembly shaft; and a toothed belt configured to meshingly engage each of the coupling gear and the first gear of the at least one effector assembly shaft.

In yet another preferred embodiment, the coupling mechanism may include: a worm gear configured to meshingly engage each of the toothed formations of the at least one handle assembly shaft and the first gear of the at least one effector assembly shaft.

According to another aspect of the invention, there is provided a method of operating a mechanically operated device, the mechanically operated device including: a handle assembly sized and shaped for grasping by a user; an effector assembly, the effector assembly including: a first actuator tiltable about a first point; a second actuator tiltable about a second point, a tubular member, the tubular member having a first end positioned proximal to the second actuator; a flexible kinematic chain, the flexible kinematic chain positioned at a second end of the tubular member; a plurality of connecting cables coupled to the second actuator and the kinematic chain, each connecting cable guided though a lumen of the tubular member and the flexible kinematic chain; and wherein the first actuator is configured to displace the second actuator thereby to impart translational motion to each connecting cable and, in use, reciprocally displace at least one connecting cable along a longitudinal axis and thereby enable movement of the flexible kinematic chain.

In a preferred embodiment, the handle assembly may include a driver, and the effector assembly may include a follower, the driver operatively may be coupled to the follower such that, in use, rotational motion of the handle assembly about the first longitudinal axis may be transmitted to the effector assembly thereby to effect rotational motion of the effector assembly about the second longitudinal axis.

In another preferred embodiment, the mechanically operated device may further include: at least one handle assembly shaft movably disposed within the handle assembly; at least one effector assembly shaft movably disposed within the effector assembly; a coupler configured to freely rotatably operatively couple each of the at least one handle assembly shaft and the at least one effector assembly shaft; and the end effector comprising a grasping assembly, the grasping assembly including at least two mobile jaws, and wherein the at least one handle assembly shaft, the at least one effector assembly shaft, and the scissor-handle-type mechanism are configured such that, in use: opening the scissor-handle-type mechanism into an open position biases the at least one handle assembly shaft, the coupler, and the at least one effector assembly shaft each into a first position; and closing the scissor-handle-type mechanism into a closed position biases the at least one handle assembly shaft, the coupler, and the at least one effector assembly shaft each into a second position, and wherein the at least one effector assembly shaft and the grasping assembly are operatively coupled such that, in use, when the at least one effector assembly shaft is biased into the first position, the grasping assembly will be biased into an open releasing configuration; and when the at least one effector assembly shaft is biased into the second position, the grasping assembly will be biased into a closed grasping configuration.

In yet another preferred embodiment, the mechanically operated device further including: at least one handle assembly shaft movably disposed within the handle assembly, the at least one handle assembly shaft including toothed formations; at least one effector assembly shaft movably disposed within the effector assembly, the at least one effector assembly shaft including a first gear at a first end and a second gear at a second end; a coupling mechanism configured to meshingly engage each of the toothed formations of the at least one handle assembly shaft and the first gear of the at least one effector assembly shaft; and the end effector including: an end effector gear configured to meshingly engage the second gear of the at least one effector assembly shaft; and a grasping assembly, the grasping assembly including at least two mobile jaws, and wherein the at least one handle assembly shaft, the at least one effector assembly shaft, and the scissor-handle-type mechanism are configured such that, in use: opening the scissor-handle-type mechanism into an open position biases the at least one handle assembly shaft, the coupling mechanism, and the at least one effector assembly shaft each into a first position; and closing the scissor-handle-type mechanism into a closed position biases the at least one handle assembly shaft, the coupling mechanism, and the at least one effector assembly shaft each into a second position, and wherein the at least one effector assembly shaft and the grasping assembly are operatively coupled such that, in use, when the at least one effector assembly shaft is biased into the first position, the grasping assembly will be biased into an open releasing configuration; and when the at least one effector assembly shaft is biased into the second position, the grasping assembly will be biased into a closed grasping configuration.

The mimicked motion of the user's hand may include several different motions. Such motions may include, for example, heaving (moving up and down), pitching (tilting forward and backward), rolling (tilting side to side), surging (moving forward and backward), swaying (moving left and right), and yawing (turning left and right). Movements such as opening and closing of the end effector may also be included.

It will be appreciated that the mimicking of motions such as abduction, adduction, circumduction, diagonal abduction, eversion, extension, external rotation, flexion, horizontal abduction, horizontal adduction, internal rotation, inversion, lateral flexion, pronation, rotation, and supination, when appropriate, are particularly beneficial.

It will also be appreciated that the mimicked motions of the user can be performed at a different scale by the end effector.

A person skilled in the art will appreciate that the mechanical operated device disclosed herein can be configured for single use or multi-use, i.e., used multiple times. Furthermore, a person skilled in the art will also appreciate that whether for single use or multiple use, the mechanically operated device disclosed herein can be configured to be disassembled, cleaned, for replacement of parts, and sterilization before use or re-use.

A persona skilled in the art will appreciate that the end effector may be an aspiration conduit in fluid communication with a vacuum source, a camera in communication with a display system, a cutting and dissecting instrument, a grasping and/or holding instrument, a haemostatic instrument, an irrigation conduit in fluid communication with an irrigation fluid source, a light source, a retractor, a tissue unifying instrument, or any combination of the above mentioned.

A person skilled in the art will appreciate that the grasping and/or holding instrument may be in the form of non-ratchetting jaws or ratchetting jaws.

Other aspects of the invention are also disclosed with reference to accompanying drawings and examples.

BRIEF DESCRIPTION OF THE DRAWINGS

Notwithstanding any other forms which may fall within the scope of the present disclosure, preferred embodiments of the disclosure will now be described, by way of example only, with reference to the accompanying drawings in which.

DETAILED DESCRIPTION OF SPECIFIC EMBODIMENTS

Figure 1:
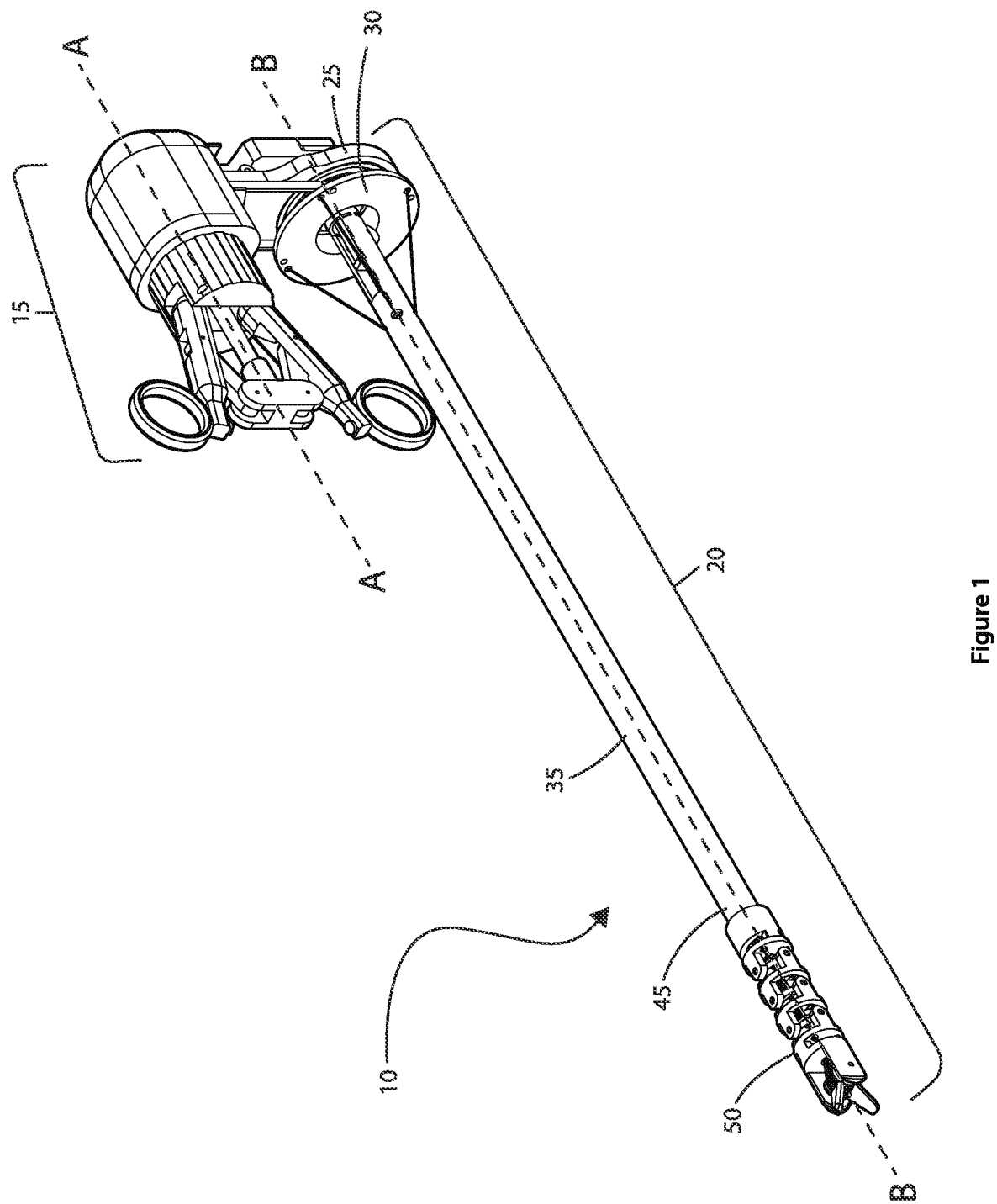
FIG. 1 is an isometric view of a mechanically operated device according to the invention.
Figure 2:
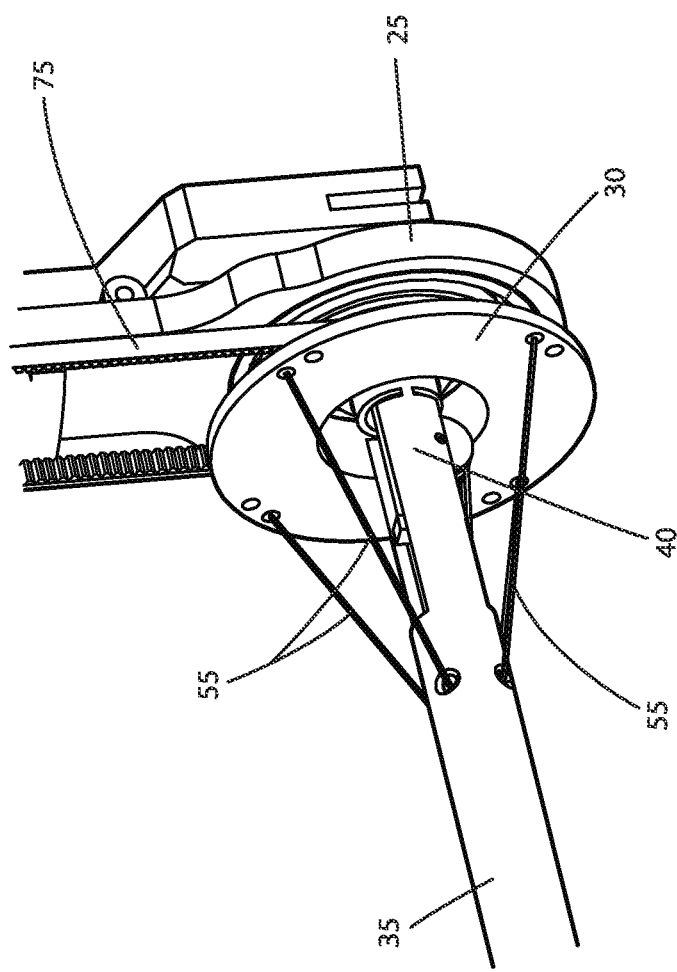
FIG. 2 is a detailed view of a portion of each of the tubular member and the first handle assembly, the first and second actuator, and the connecting cables of the mechanically operated device of FIG. 1.
Figure 3:
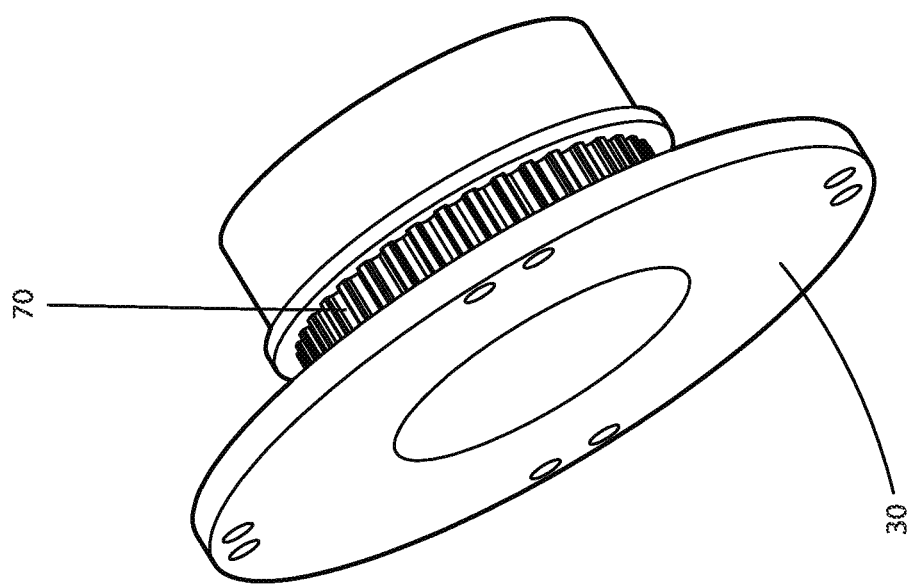
FIG. 3 is a perspective view of the second actuator and the follower of the mechanically operated device of FIG. 1.
Figure 4:
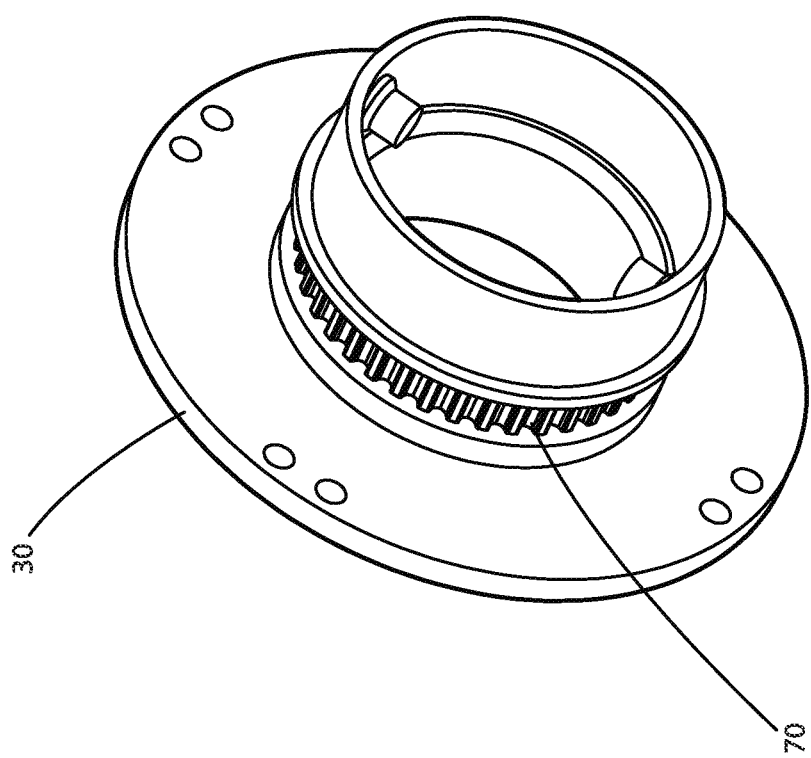
FIG. 4 is another perspective view of the second actuator and the follower of the mechanically operated device of FIG. 1.

Exemplary embodiments will now be described, by way of example only, to enable an understanding and appreciation of the underlying principles of a mechanically operated device, in particular the structure and function thereof, and methods of use of the mechanically operated device as disclosed herein.

A person skilled in the art will appreciate that one or more feature as described with respect to one exemplary embodiment may be combined with one or more feature(s) of another embodiment. Where relevant, such combinations are intended to be within the scope of the present invention.

The present invention provides a mechanically operated device and a method of using such a mechanically operated device such that motion of a user's hand is mimicked, and not mirrored, by an end effector.

FIGS. 1-8 disclose preferred embodiments of a mechanically operated device (10). The mechanically operated device (10) has a handle assembly (15) and an effector assembly (20). The handle assembly (15) is configured for grasping by a user (not shown) and to rotate about a first longitudinal axis (A-A). The effector assembly (20) is configured to rotate about a second longitudinal axis (B-B). In this context, a person skilled in the art will appreciate that the configuration of the handle assembly (15) is indicative of being sized and shaped for ease of grasping by the user (not shown).

The disclosed effector assembly (20) has a first actuator (25), which is tiltable about a first point, and a second actuator (30), which in turn is tiltable about a second point. The effector assembly (20) also includes a tubular member (35) having a first end (40) and a second end (45), and a flexible kinematic chain (50). The first end (40) of the tubular member (35) is positioned adjacent to the second actuator (30). The flexible kinematic chain (50) is positioned at the second end (45) of the tubular member (35). Connecting cables (55) coupled to the second actuator (30) and the flexible kinematic chain (50) are guided though a lumen (not shown) of the tubular member (35) and through the flexible kinematic chain (50).

In use, movement of the first actuator (25) displaces the second actuator (30) which, in turn, imparts translational motion to at least one of the connecting cables (55). Such movement of at least one of the connecting cables (55) causes the flexible kinematic chain (50) to move.

The handle assembly (15) has a driver (65) and the effector assembly (20) has a follower (70). The driver (65) and the follower (70) are gears operatively coupled by a toothed belt (75) such that, in use, rotational motion of the handle assembly (15) about the first longitudinal axis (A-A) is transmitted to the effector assembly (20), which thereby effects rotational motion of the effector assembly (20) about the second longitudinal axis (B-B). Alternatively, it is foreseen that where the driver (65) and the follower (70) are gears, the driver (65) and the follower (70) can be coupled by a worm or a helical gear (not shown). Alternatively, it will be appreciated that the driver (65) and the follower (70) could be wheels that are coupled by a belt (not shown).

Figure 6:
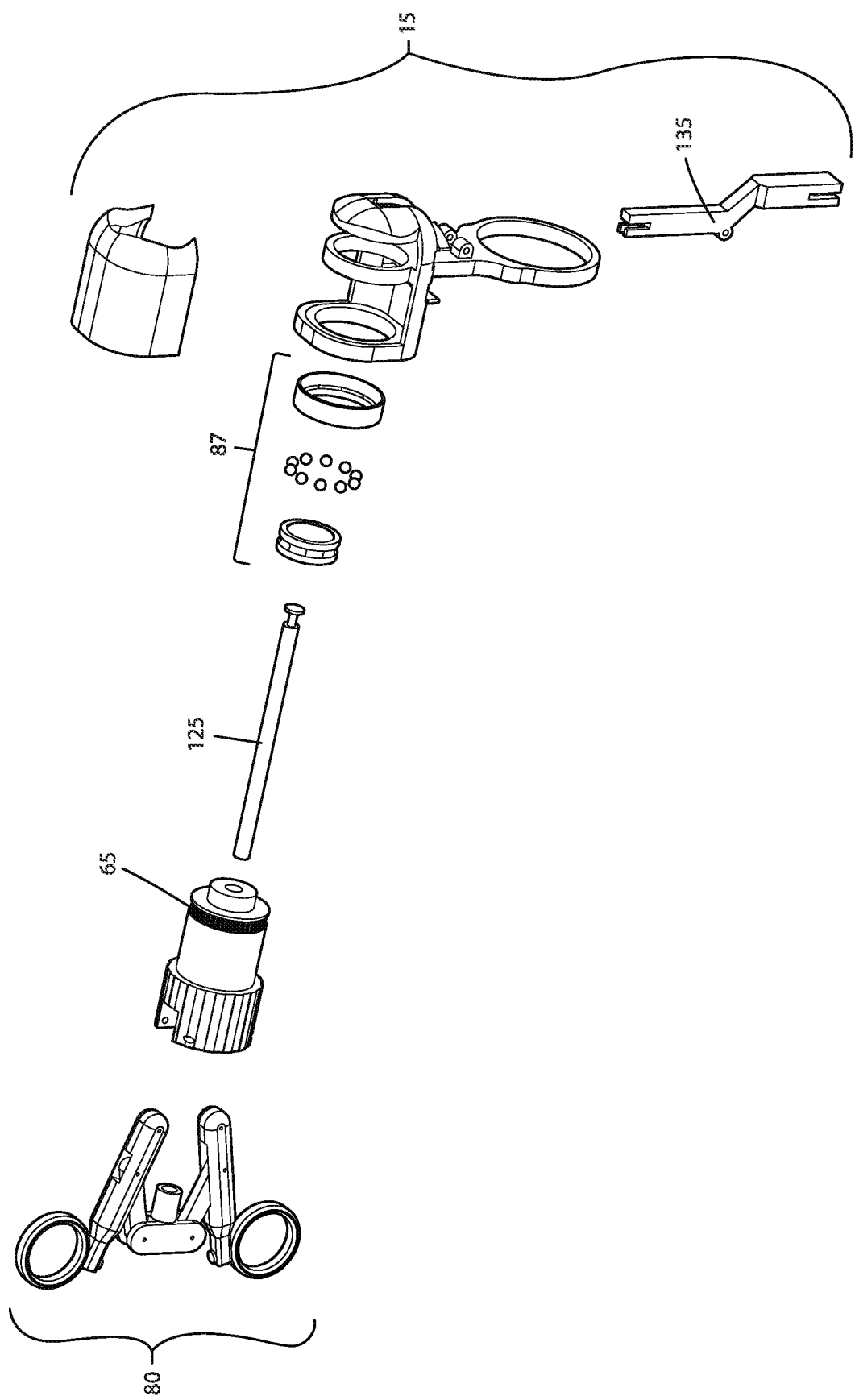
FIG. 6 is an exploded view of the first end of the effector assembly of the mechanically operated device of FIG. 1.

FIG. 6 shows the handle assembly (15) rotatably engages an end effector controller (80) in a form of a scissor-handle-type mechanism (200), which is configured to be held by a hand of the user (not shown). The end effector controller (80) in the form of a scissor-handle-type mechanism is operatively coupled to the end effector (85). A ball bearing mount (87) enables rotation of the handle assembly (15) about the first longitudinal axis (A-A).

FIG. 6 discloses a ball bearing mount (110) that facilitates rotatable engagement of the outer gimbal (105) and the second actuator (30) of the mechanically operated device (10).

Figure 7:
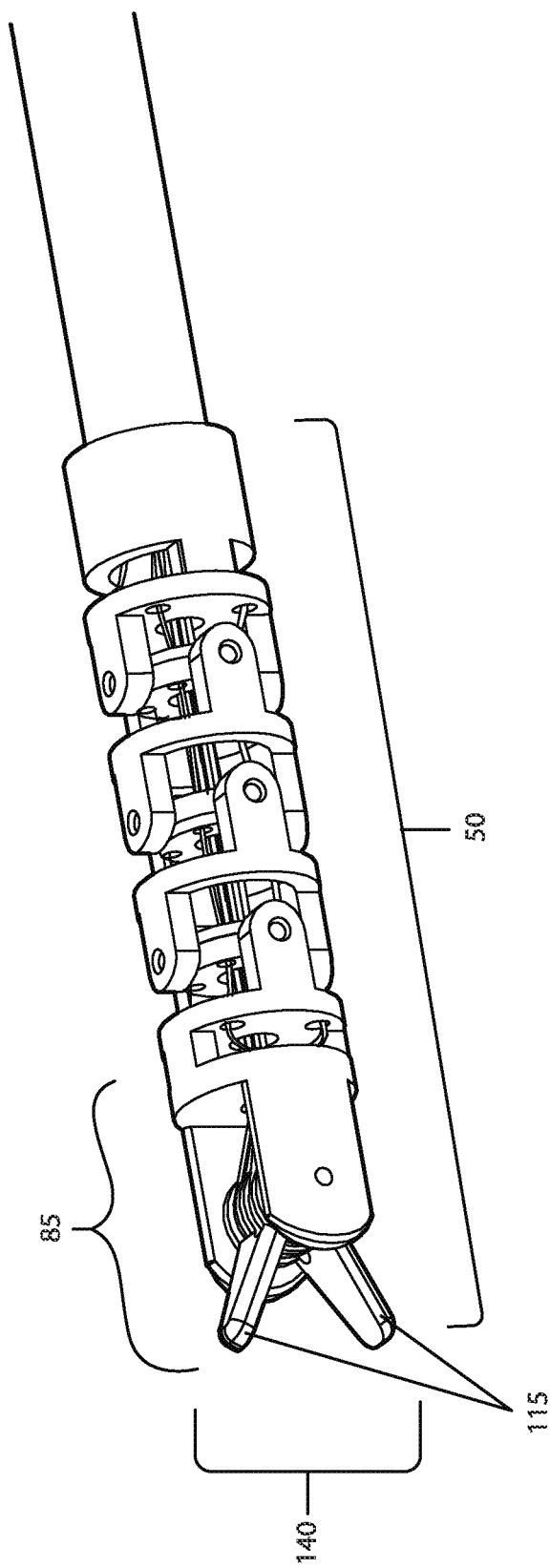
FIG. 7 is a detailed view of a flexible kinematic chain and end effector of the mechanically operated device of FIG. 1.

FIG. 7 discloses an end effector (85) in a form of a grasping assembly having two movable jaws (115) coupled to a distal end (120) of the flexible kinematic chain (50).

Figure 8:
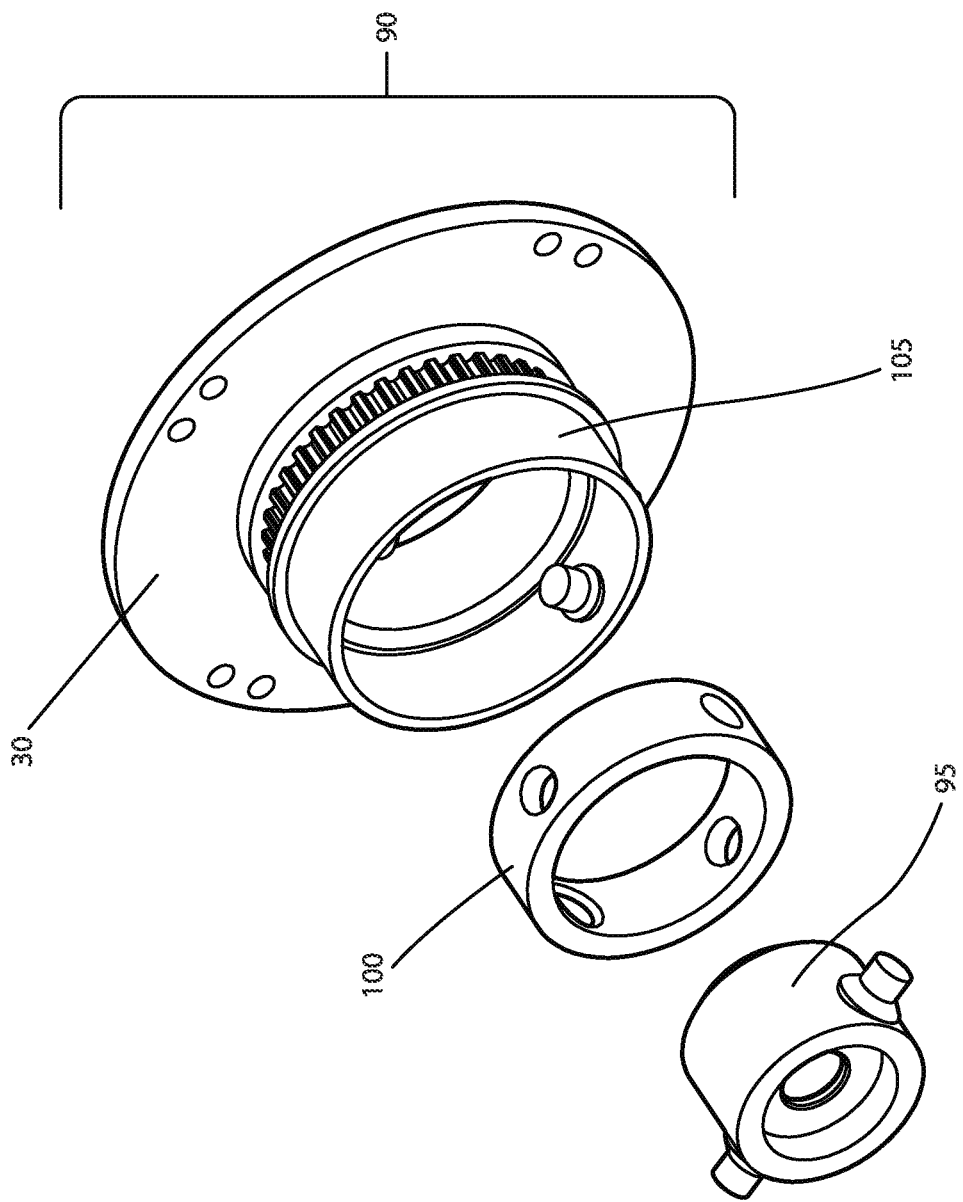
FIG. 8 is an exploded view of a gyroscope of the mechanically operated device of FIG. 1.
Figure 9:
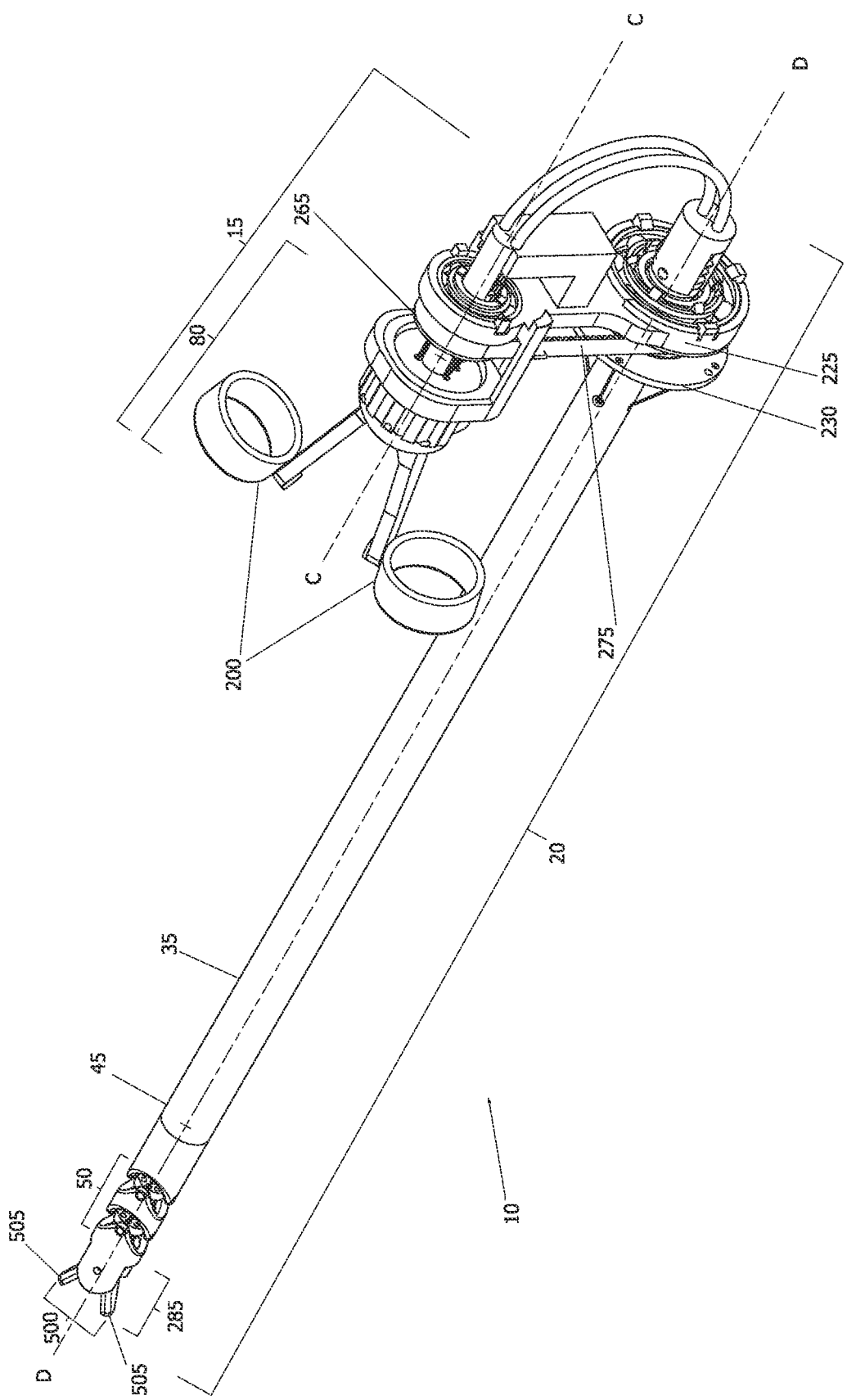
FIG. 9 is an isometric view of another mechanically operated device according to the invention.
Figure 10:
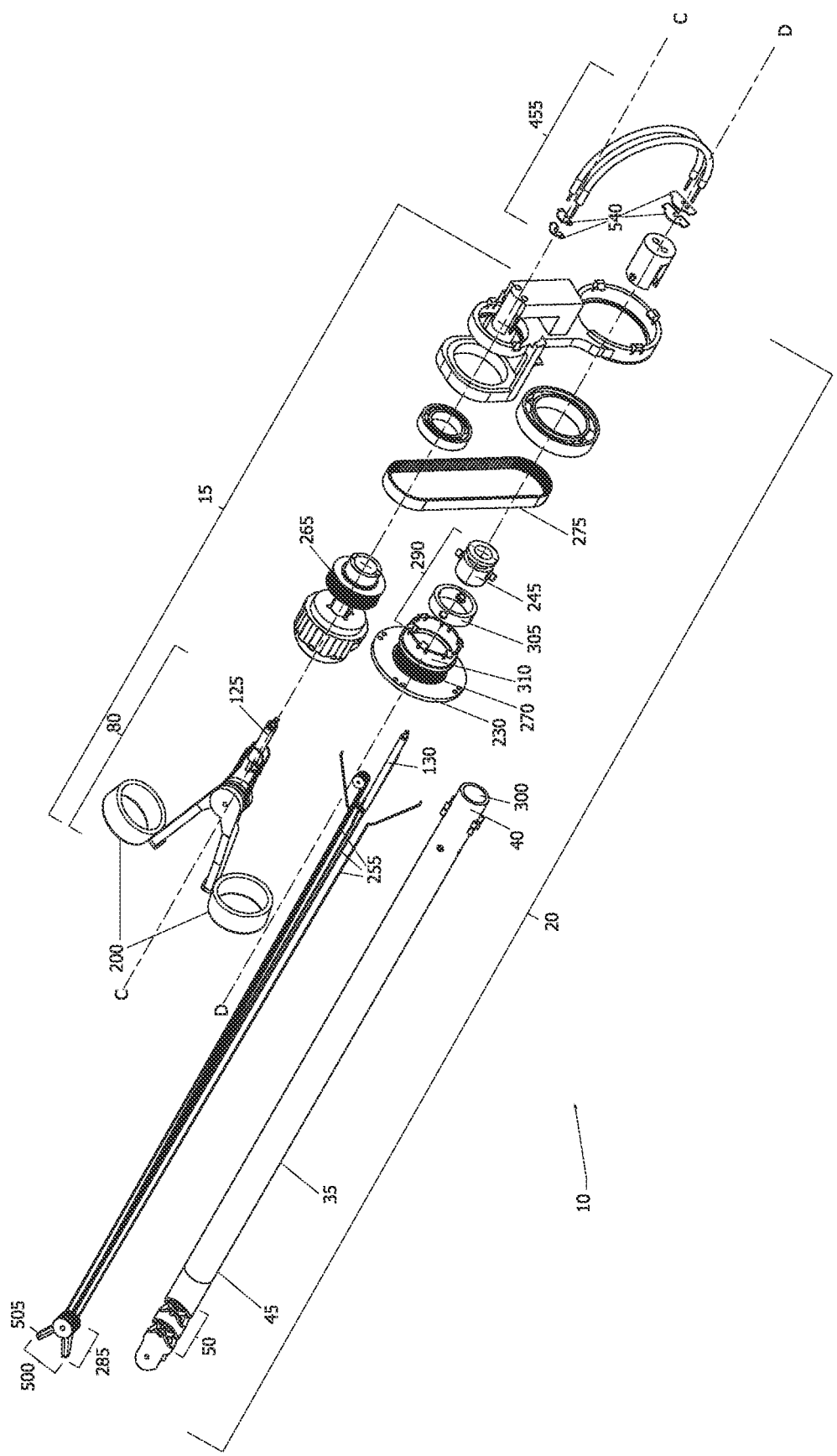
FIG. 10 is an exploded view of the mechanically operated device of FIG. 9.
Figure 11:
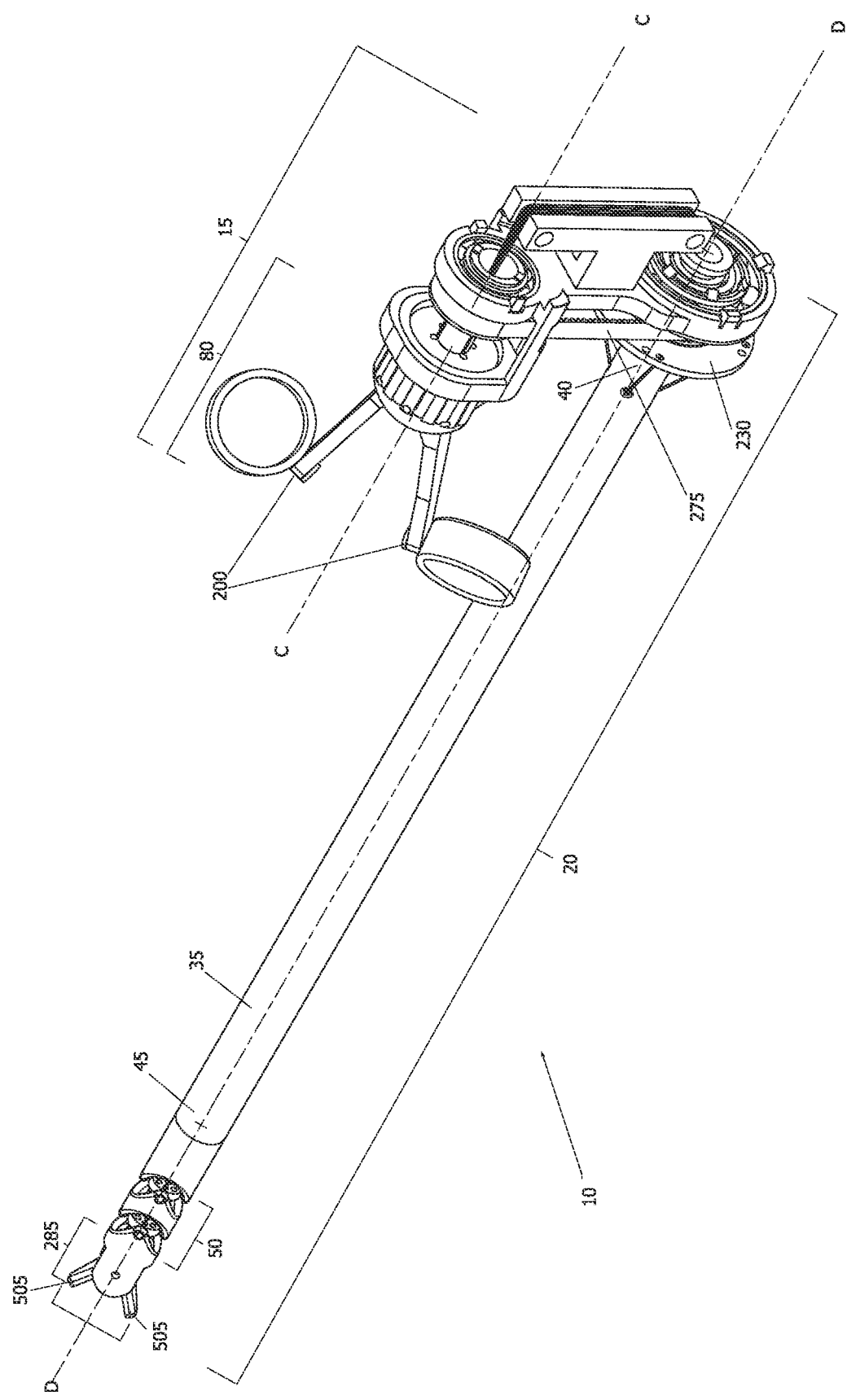
FIG. 11 an isometric view of another mechanically operated device according to the invention.
Figure 12:
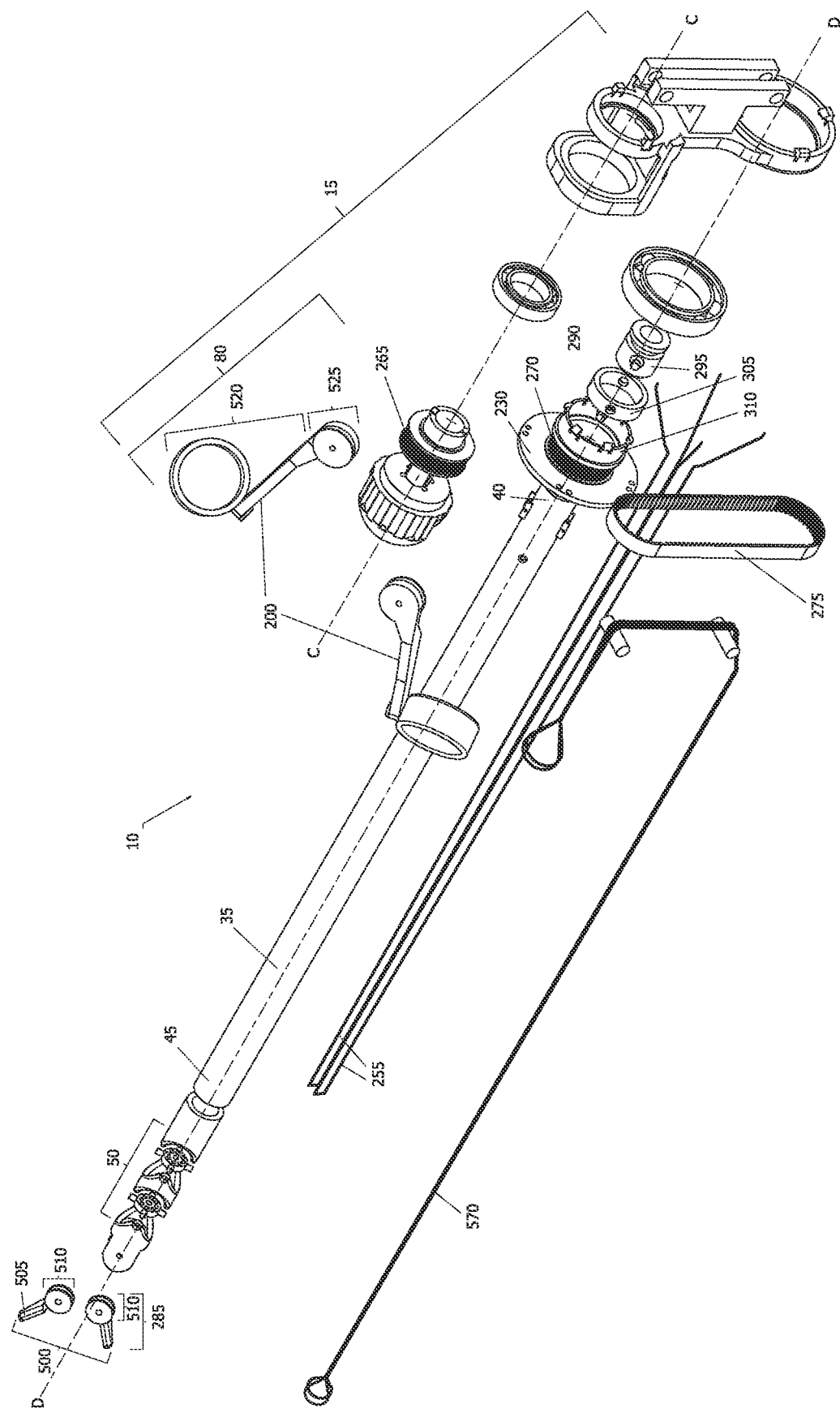
FIG. 12 is an exploded view of the mechanically operated device of FIG. 11.
Figure 13:
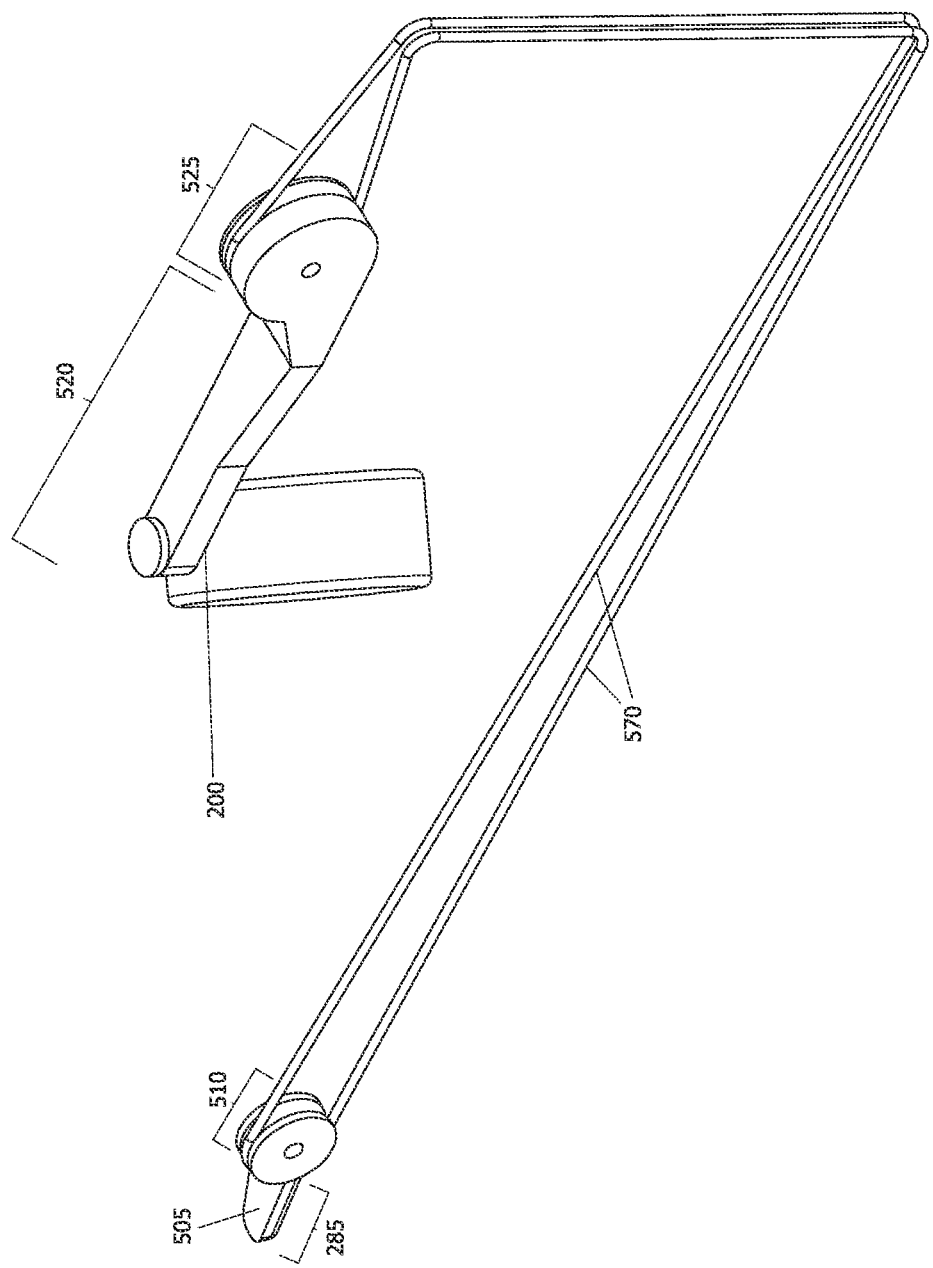
FIG. 13 is a detailed view of one handle of the scissor-handle-type mechanism having at least one handle actuator drive element, a loop of flexible material, and one grasping formation having at least one grasping formation drive element of the mechanically operated device of FIG. 11.
Figure 14:
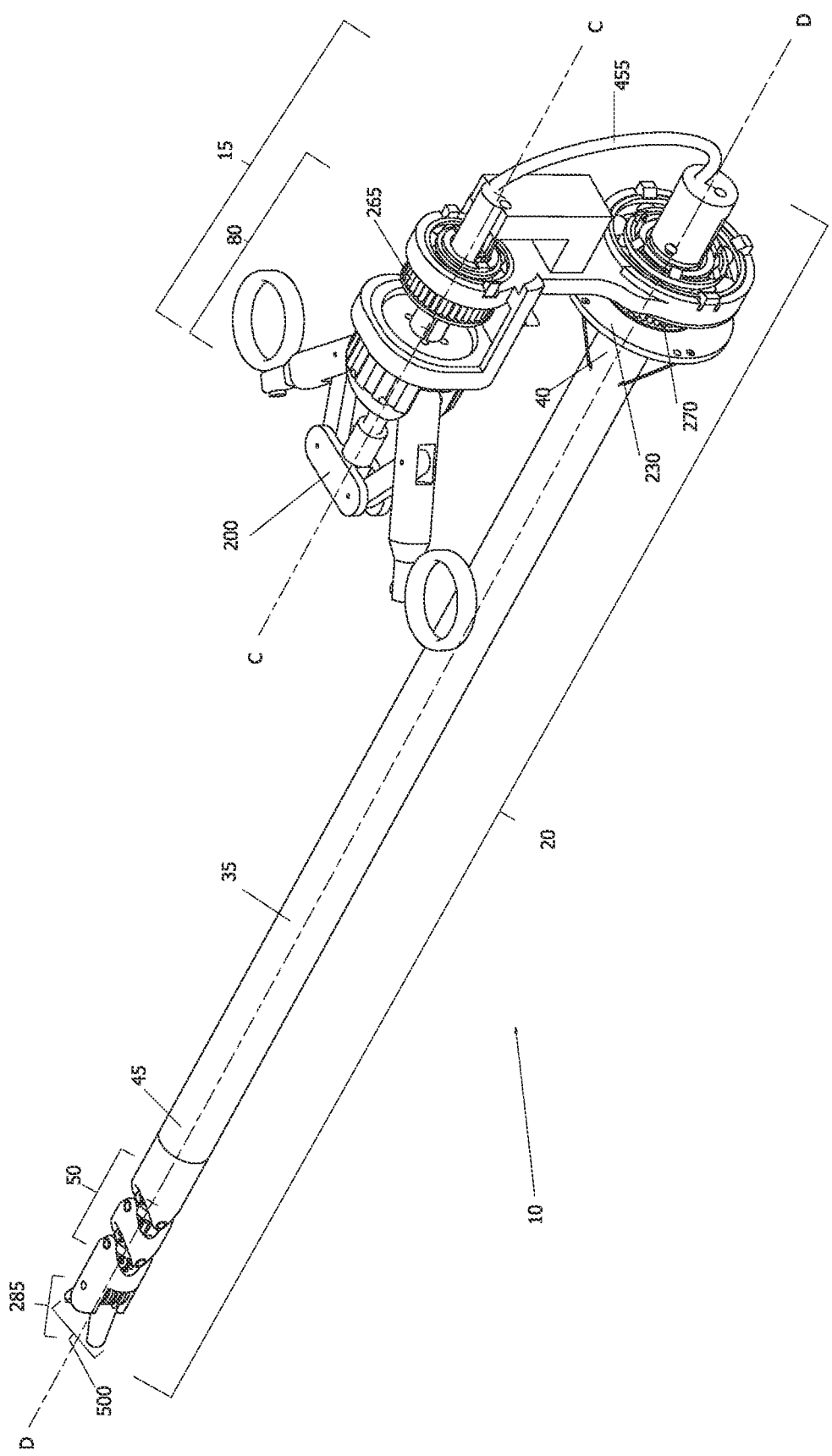
FIG. 14 an isometric view of another mechanically operated device according to the invention.
Figure 15:
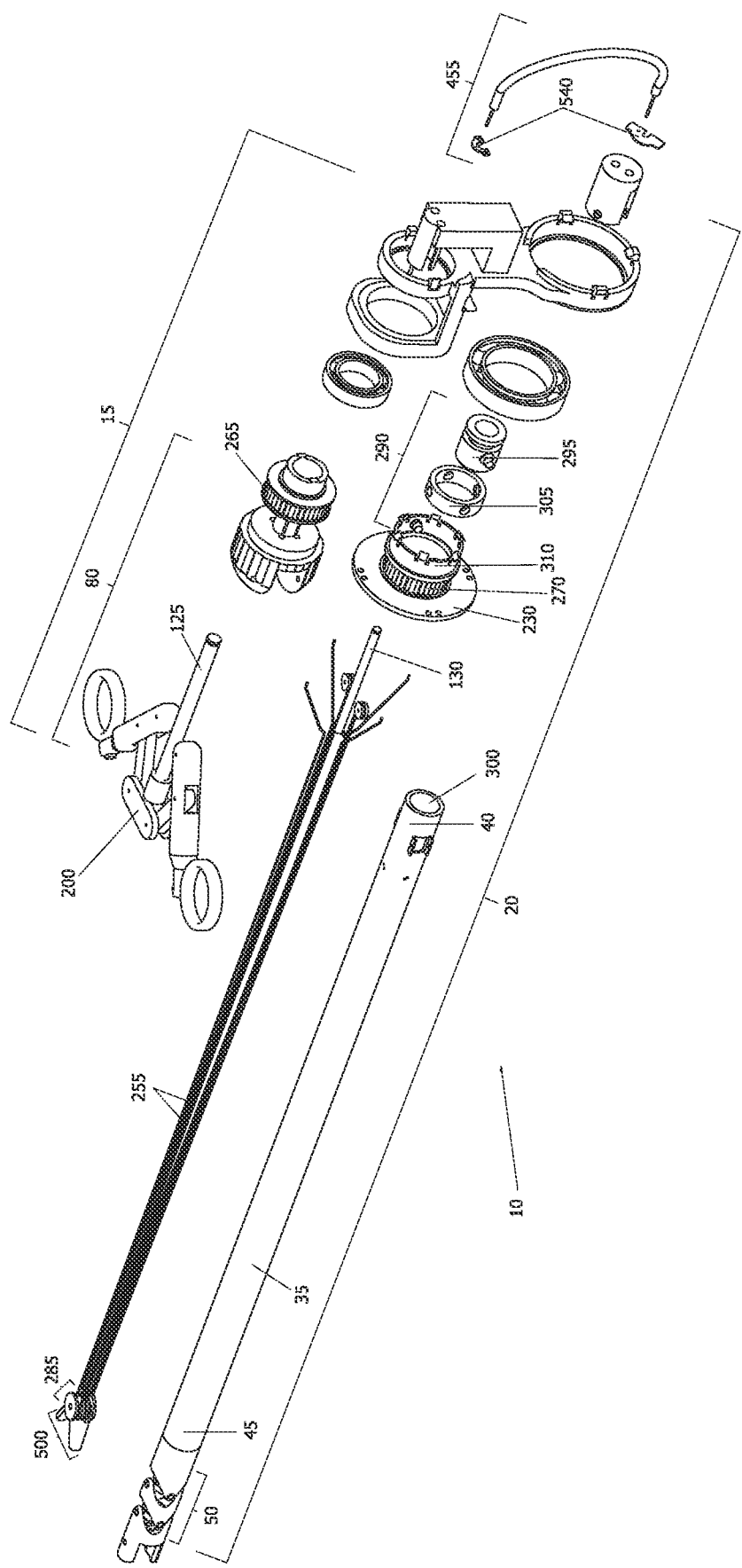
FIG. 15 is an exploded view of the mechanically operated device of FIG. 14.
Figure 16:
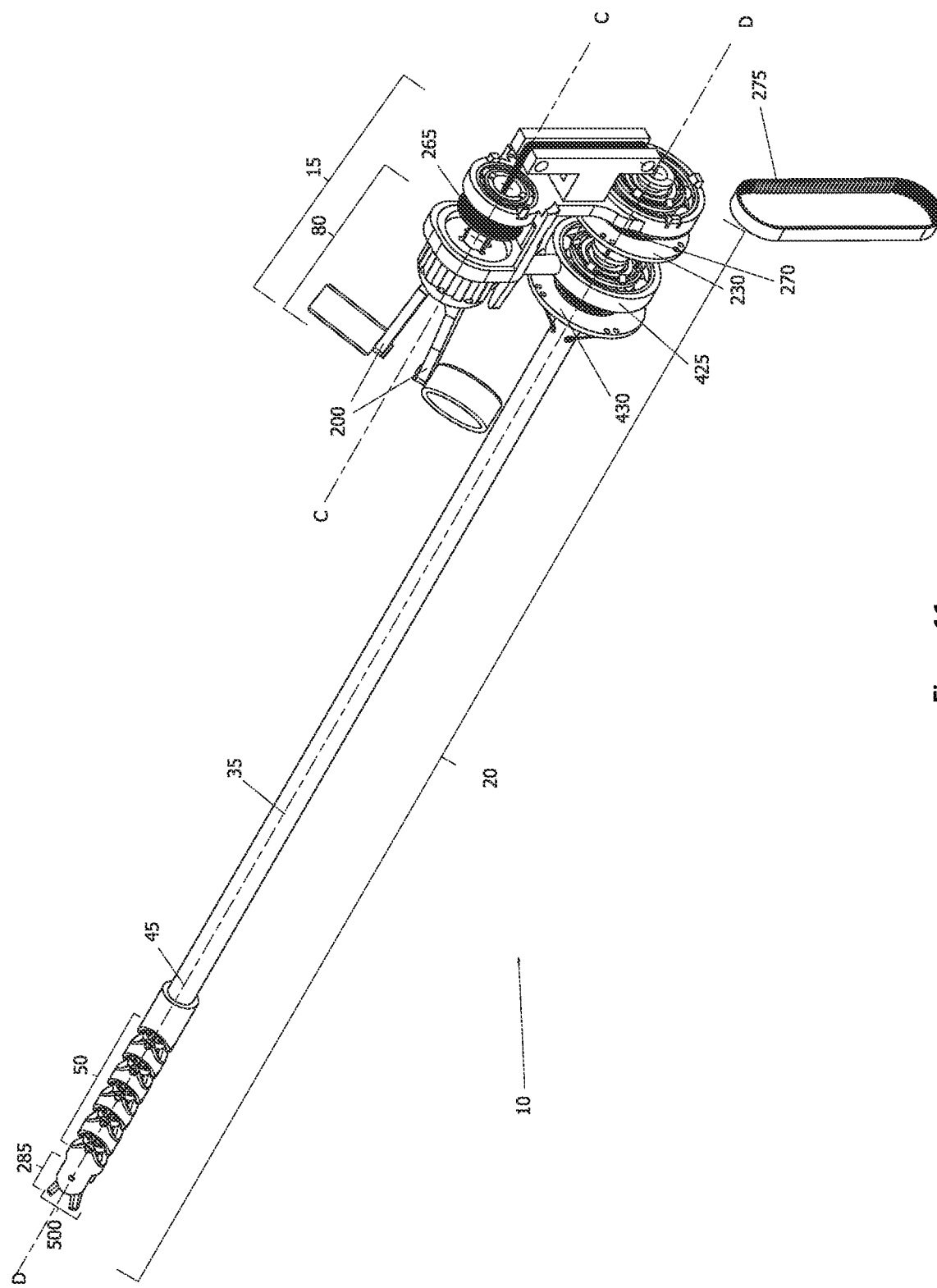
FIG. 16 is a partially exploded and isometric view of another mechanically operated device according to the invention.
Figure 17:
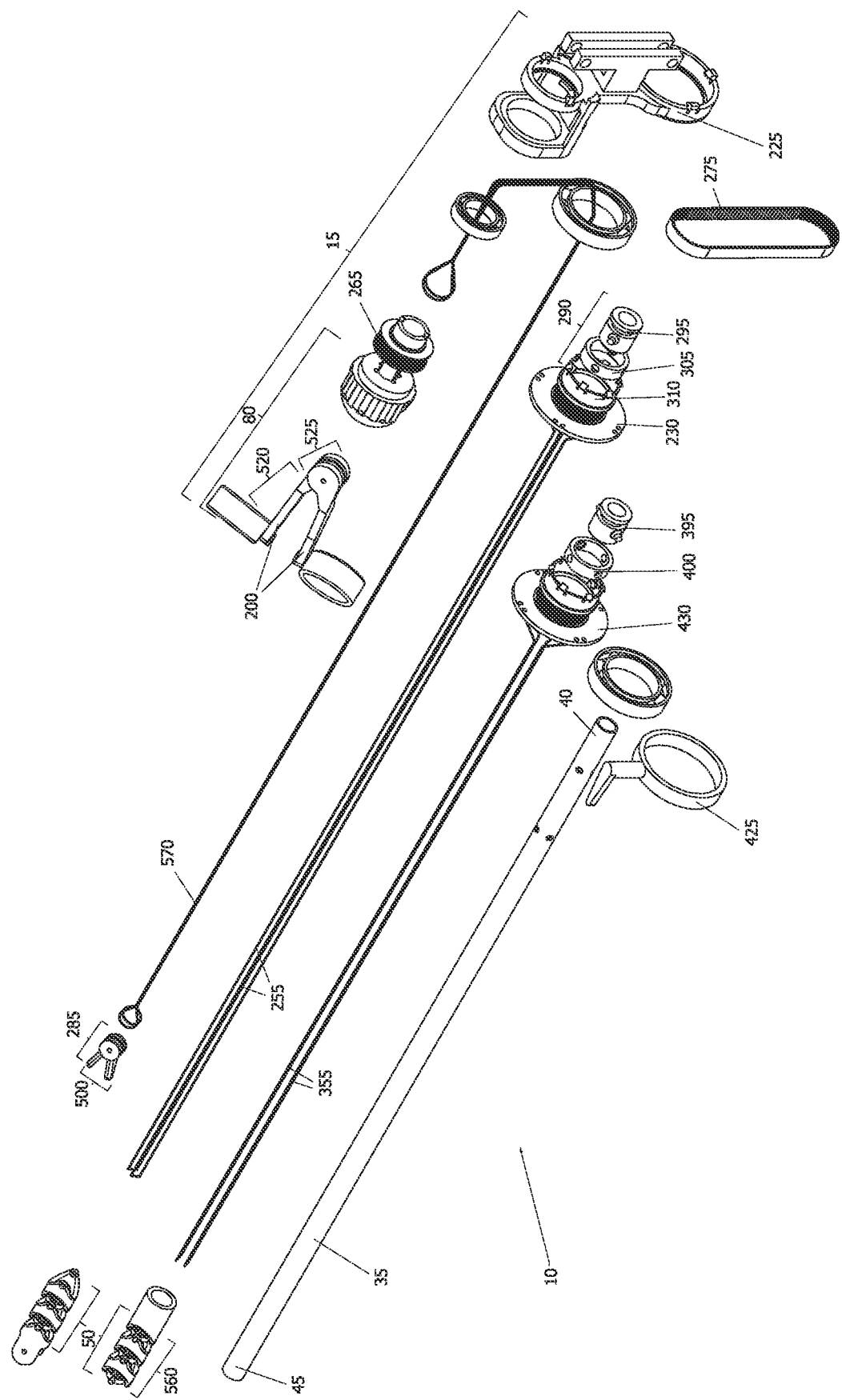
FIG. 17 is an exploded view of the mechanically operated device of FIG. 16.
Figure 18:
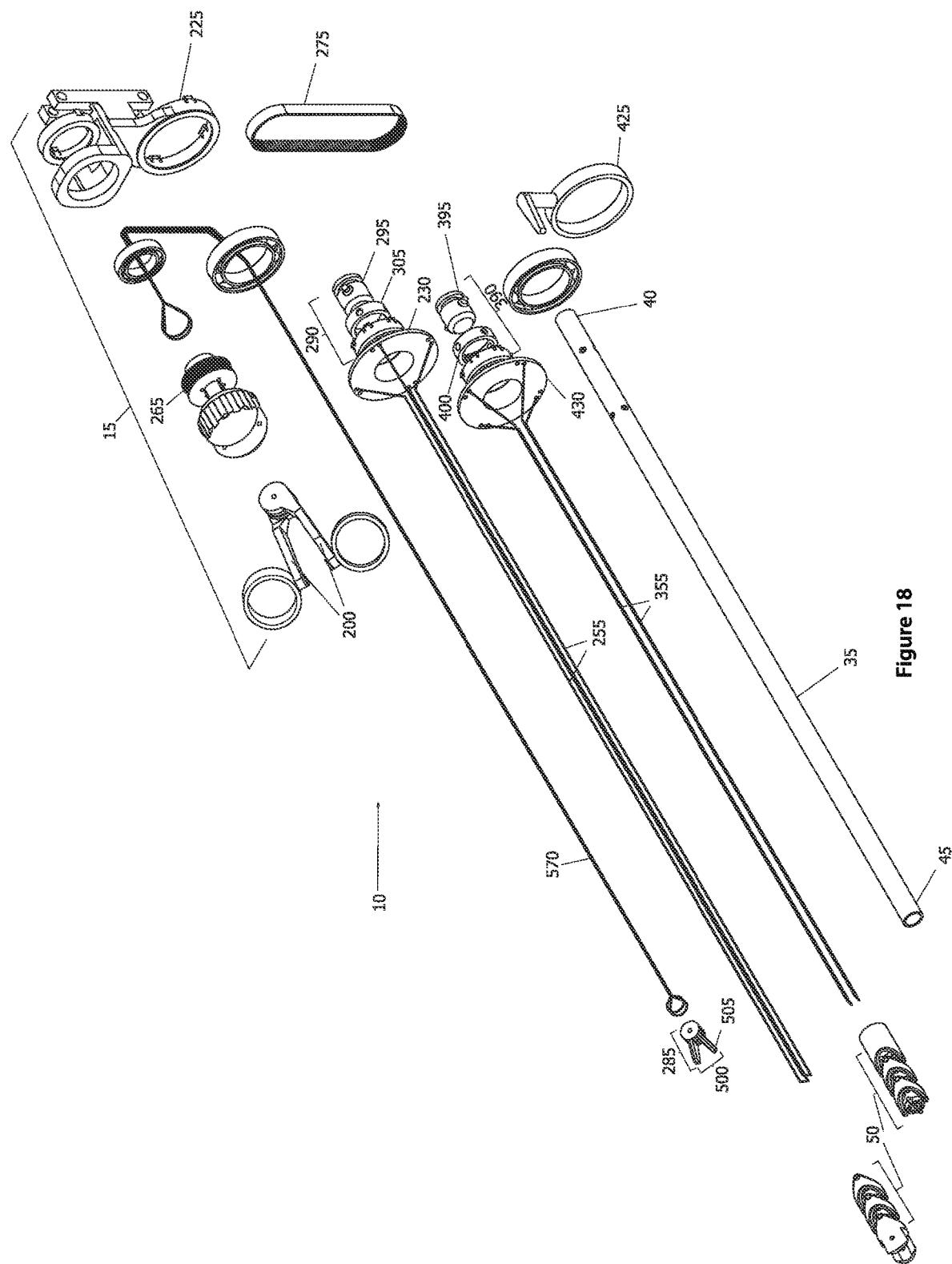
FIG. 18 is another isometric view of the mechanically operated device of FIG. 16 and FIG. 17.
Figure 19:
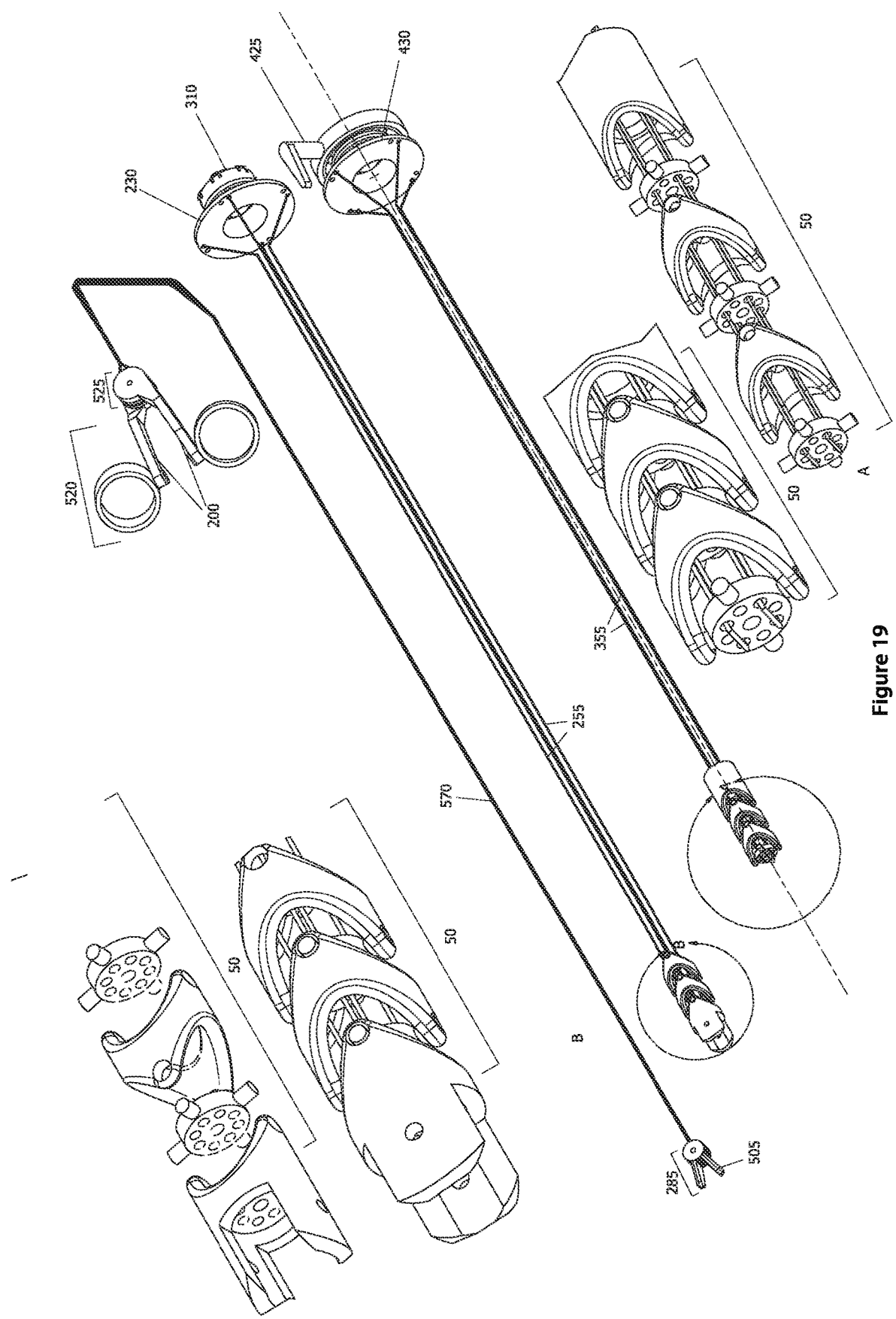
FIG. 19 is isometric detailed views of components of an effector assembly, connecting cables, and a flexible kinematic chain according to the invention.

FIG. 8 discloses an exploded view of a gyroscope (90) of another embodiment of the mechanically operated device is rotatable relative to and adjacent the second actuator (30). The gyroscope (90) has an inner gimbal (95), a middle gimbal, (100), and an outer gimbal (105).

The outer gimbal (105) is rotatably mountable to the middle gimbal (100) and the middle gimbal (100) is rotatably mountable to the inner gimbal (95). The inner gimbal (95), a middle gimbal, (100), and an outer gimbal (105) rotate in two orthogonal directions (not shown). In use, the gyroscope (90) is configured for close engagement of the inner gimbal (95) and the first end (not shown) of the tubular member (not shown).

In preferred embodiments of the invention, the end effector includes a camera device, a cutting device, a grasping device, an inflating device, an irrigation device, a lighting device, a staple device, a suction device, a suture device, and any combination of the above-mentioned devices are also contemplated.

Figure 5:
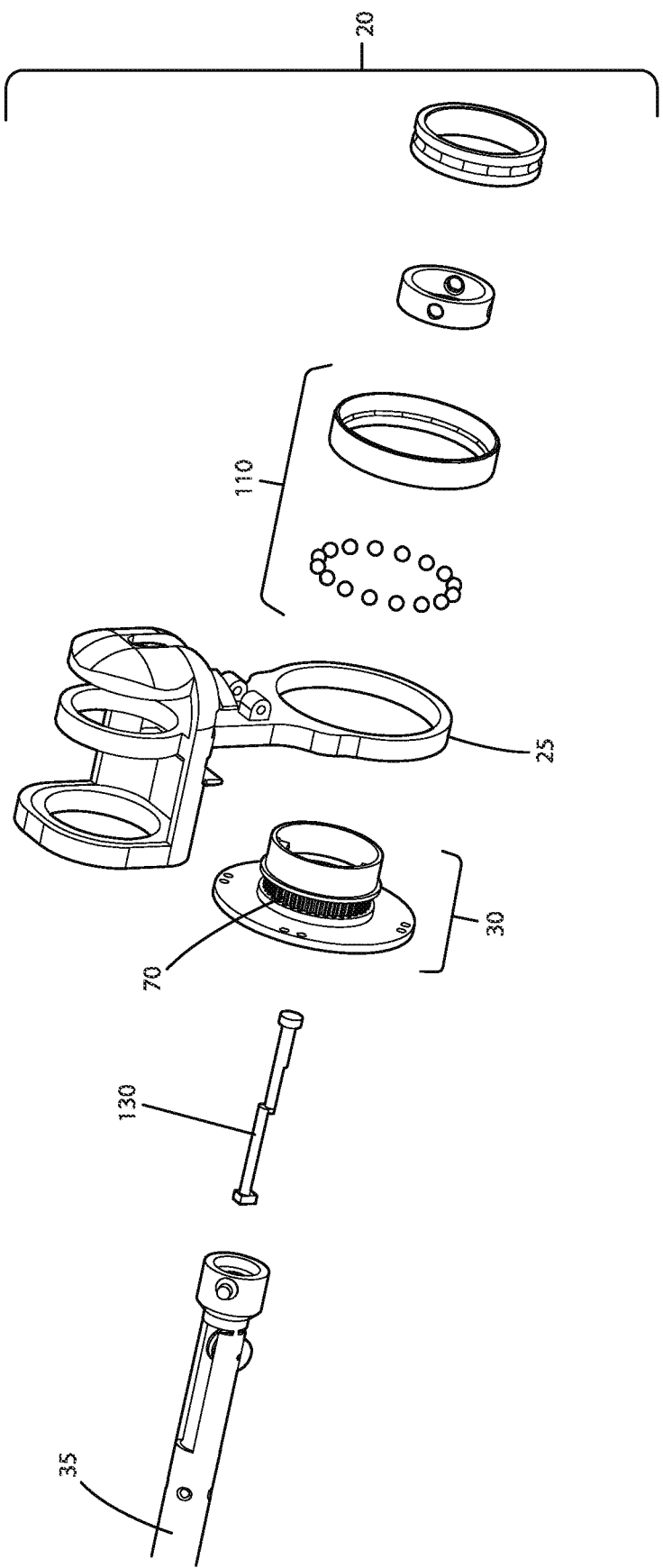
FIG. 5 is an exploded view of the handle assembly and coupler of the mechanically operated device of FIG. 1.

In preferred embodiments, as illustrated in FIGS. 5, 6, and 7, a handle assembly shaft (125) is movably disposed within the handle assembly (15). An effector assembly shaft (130) is movably disposed within the effector assembly (20). A coupler (155) is configured to freely and rotatably operatively couple the handle assembly shaft (125) and the effector assembly shaft (130).

The end effector (85) has a grasping assembly (140), the grasping assembly (140) having at least two mobile jaws (115). The handle assembly shaft (125), the effector assembly shaft (130), and end effector controller (80) in the form of a scissor-handle-type mechanism (200) are configured such that, in use: opening the end effector controller (80) in the form of a scissor-handle-type mechanism (200) into an open position (not shown) biases the handle assembly shaft (125), the coupler (155), and the effector assembly shaft (130) each into a first position (not shown). Conversely, closing the end effector controller (80) in the form of a scissor-handle-type mechanism (200) into a closed position (not shown) biases the handle assembly shaft (125), the coupler (155), and the effector assembly shaft (130) each into a second position (not shown).

The effector assembly shaft (130) and the grasping assembly (140) are operatively coupled such that, in use, when the effector assembly shaft (130) is biased into the first position (not shown), the grasping assembly (140) is biased into an open releasing configuration (FIG. 7); and when the effector assembly shaft (130) is biased into the second position (not shown), the grasping assembly (140) is biased into a closed grasping configuration (not shown).

In further alternative embodiments (not shown), the handle assembly shaft is movably disposed within the handle assembly. The handle assembly shaft has toothed formations. The effector assembly shaft is movably disposed within the effector assembly. The effector assembly shaft has a first gear at a first end and a second gear at a second end. A coupling mechanism is configured to meshingly engage each of the toothed formations of the handle assembly shaft and the first gear of the effector assembly shaft. The end effector has an end effector gear configured to meshingly engage the second gear of the effector assembly shaft.

The mechanically operated device has a grasping assembly that has at least two mobile jaws. The handle assembly shaft, the effector assembly shaft, and the scissor-handle-type mechanism are configured such that, in use: opening the scissor-handle-type mechanism into an open position biases the handle assembly shaft, the coupling mechanism, and the effector assembly shaft each into a first position. Conversely, closing the scissor-handle-type mechanism into a closed position biases the handle assembly shaft, the coupling mechanism, and the effector assembly shaft each into a second position.

The effector assembly shaft and the grasping assembly are operatively coupled such that, in use, when the effector assembly shaft is biased into the first position, the grasping assembly will be biased into an open releasing configuration. Conversely, when the at least one effector assembly shaft is biased into the second position, the grasping assembly will be biased into a closed grasping configuration.

Further alternative embodiments of the coupling mechanism having a coupling gear configured to meshingly engage the toothed formations of the at least one handle assembly shaft and a toothed belt configured to meshingly engage each of the coupling gear and the first gear of the at least one effector assembly shaft. It will be appreciated that in another embodiment, the coupling mechanism may be a worm gear (not shown) configured to meshingly engage each of the toothed formations of the at least one handle assembly shaft and the first gear of the at least one effector assembly shaft.

FIGS. 9-21 disclose further preferred embodiments of the mechanically operated device of the invention (10). The mechanically operated device (10) has a handle assembly (15) sized and shaped for grasping by a user (not shown) and an effector assembly (20). The effector assembly (20) includes a first primary actuator (225) tiltable about a first point (not shown), a second primary actuator (230) tiltable about a second point (not shown), and a tubular member (35). The tubular member (35) has a first end (40) positioned proximal to the second primary actuator (230). A flexible kinematic chain (50) is positioned at a second end (45) of the tubular member (35). A plurality of primary connecting cables (255) are coupled to the second primary actuator (230) and at least a first part of the flexible kinematic chain (50). Each primary connecting cable (255) is guided at least though a lumen (300) of the tubular member (35) and at least partially through the flexible kinematic chain (50). The first primary actuator (225) is configured to displace the second primary actuator (230) thereby to impart translational motion to each primary connecting cable (255) and, in use, reciprocally displace at least one primary connecting cable (255) along a longitudinal axis of the at least one primary connecting cable (255) and thereby enable movement of the at least first part of the flexible kinematic chain (50).

A primary gyroscope (290) having a primary inner gimbal (295), a primary middle gimbal (305) and a primary outer gimbal (310) is rotatable relative to and adjacent the second primary actuator (230). The primary outer gimbal (310) is rotatably mounted to the primary middle gimbal (305), and the primary middle gimbal (305) is rotatably mounted to the primary inner gimbal (295). The primary inner gimbal (295), primary middle gimbal (305), and the primary outer gimbal (310) are arranged to in two orthogonal directions. The primary inner gimbal (295) is configured to engage the first end of the tubular member (35). The first primary actuator (225) is arranged to rotatably engage the second primary actuator (230).

The effector assembly (20) includes a first secondary actuator (425) tiltable about a third point (not shown) and a second secondary actuator (430) tiltable about a fourth point (not shown). A plurality of secondary connecting cables (355) are coupled to the second secondary actuator (430) and at least a second part of the flexible kinematic chain (50). Each secondary connecting cable (355) is guided at least though the lumen (300) of the tubular member (35) and the at least second part (560) of the flexible kinematic chain (50). The first secondary actuator (425) is configured to displace the second secondary actuator (430) and thereby impart translational motion to each secondary connecting cable (355) and, in use, reciprocally displace at least one secondary connecting cable (355) along a longitudinal axis of the at least one secondary connecting cable (355) and thereby enable movement of the at least second part of the flexible kinematic chain (50).

A secondary gyroscope (390) having a secondary inner gimbal (395), a secondary middle gimbal (400), and a secondary outer gimbal (410) are arranged rotatable relative to and adjacent the second secondary actuator (430). The secondary outer gimbal (410) is rotatably mounted to the secondary middle gimbal (400) and the secondary middle gimbal (400) is rotatably mounted to the secondary inner gimbal (395). The secondary inner gimbal (395), secondary middle gimbal (400), and the secondary outer gimbal (410) rotate in two orthogonal directions. The first secondary actuator (425) rotatably engages the second secondary actuator (430).

As shown, for example, in FIGS. 9-12 and FIGS. 14-18, the handle assembly (15) is configured to rotate about a longitudinal axis of the handle assembly (C-C).

As shown, for example, in FIGS. 9-12 and FIGS. 14-18, the effector assembly (20) is configured to rotate about a longitudinal axis of the effector assembly (20).

In another embodiment (shown, for example, in FIGS. 20 and 21), the longitudinal axis of the handle assembly (C-C) and longitudinal axis of the effector assembly (20) is substantially identical.

In some embodiments (shown, for example, in FIGS. 9-12 and FIGS. 14-18), the handle assembly (15) is operatively coupled to the effector assembly (20). The handle assembly (15) includes a driver (265) and the effector assembly includes a follower (270). The driver (265) is operatively coupled to the follower (270) such that, in use, rotational motion of the handle assembly (15) about the handle longitudinal axis (C-C) is transmitted to the effector assembly (20) thereby to effect rotational motion of the effector assembly (20) about the longitudinal axis of the effector assembly (20). The driver (265) and the follower (270) are gears operatively coupled by a toothed belt (275). It is contemplated that driver (265) and the follower (270) could be coupled by other means known to a person skilled in the art, for example, a belt, a worm, or a helical gear.

The mechanically operated device (10) includes an end effector (285) coupled to a distal end of the flexible kinematic chain (50) and an end effector controller, for example a scissor-handle-type mechanism (200) (as shown, for example, in FIGS. 9-12 and FIGS. 14-19) or a trigger mechanism (550)(as shown, for example, in FIGS. 20 and 21) is rotatably engaged to the handle assembly (15) and configured to be engaged by at least part of a hand of the user (not shown). The end effector controller (80) is operatively coupled to the end effector (285). The scissor-handle-type mechanism (200) is located adjacent the handle assembly (15).

The end effector (285) includes at least one grasping formation (505). The scissor-handle-type mechanism (200) is operatively coupled to the end effector (285) such that, in use, movement of the scissor-handle-type mechanism (200) causes a corresponding relative movement of the at least one grasping formation (505).

In some contemplated embodiments (not shown but like reference numerals are used for ease of reference), the scissor-handle-type mechanism (200) includes at least one handle actuator (520) having at least one handle actuator drive element (525). The end effector (285) includes at least one grasping formation (505) having at least one grasping formation drive element (510). At least one loop of flexible material (570) passes at least partially over the at least one handle actuator drive element (525). The at least one loop of flexible material (570) extends from the at least one handle actuator drive element (525) through at least the lumen (300) of the tubular member (35) and through the flexible kinematic chain (50) and passes at least partially over the at least one grasping formation drive element (510). The at least one loop of flexible material (570) is configured, in use: to transmit a first force generated by a movement of the at least one handle actuator drive element (525) from a first position (not shown) of the at least one handle actuator drive element (525) to a second position (not shown) of the at least one handle actuator drive element (525) to the at least one grasping formation drive element (510) such that, in use, a second force may be transmitted to the at least one grasping formation drive element (510) thereby to move the at least one grasping formation (505) from a first position (not shown) of the at least one grasping formation to a second position (not shown) of the at least one grasping formation (505).

As shown, for example, in FIGS. 11-13 and 16-19, the scissor-handle-type mechanism (200) includes a first handle actuator (520) having a handle actuator drive element (525) first handle actuator drive element (525), and a second handle actuator (520) having a second handle actuator drive element (525). The end effector (285) includes a first grasping formation (505) having a first grasping formation drive element (510) and a second grasping formation (505) having a second grasping formation drive element (510). A first loop of flexible material (570) passes at least partially over the handle actuator drive element (525) first handle actuator drive element (525), extends from the handle actuator drive element (525) first handle actuator drive element (525) through at least the lumen (300) of the tubular member (35) and through the flexible kinematic chain (50), and passes at least partially over the first grasping formation drive element (510). A second loop of flexible material (570) passes at least partially over the second handle actuator drive element (525), extends from the second handle actuator drive element (525) through at least the lumen (300) of the tubular member (35) and through the flexible kinematic chain (50), and passes at least partially over the second grasping formation drive element (510). The first loop of flexible material (570) is configured, in use to transmit a first force generated by a movement of the handle actuator drive element (525) first handle actuator drive element (525) from a first position (not shown) of the handle actuator drive element (525)first handle actuator drive element (525) to a second position (not shown) of the handle actuator drive element (525)first handle actuator drive element (525) to the first grasping formation drive element (510) such that, in use, a second force is transmitted to the first grasping formation drive element (510) thereby to move the first grasping formation (505) from a first position (not shown) of the first grasping formation (505) to a second position (not shown) of the first grasping formation (505). The second loop of flexible material (570) is configured, in use: to transmit a first force generated by a movement of the second handle actuator drive element (525) from a first position (not shown) of the second handle actuator drive element (525) to a second position (not shown) of the second handle actuator drive element (525) to the second grasping formation drive element (510) such that, in use, a second force is transmitted to the second grasping formation drive element (510) thereby to move the second grasping formation (505) from a first position (not shown) of the second grasping formation (505) to a second position (not shown) of the second grasping formation (505).

As shown, for example, in FIGS. 9, 10, 14, and 15, the mechanically operated device (10) includes at least one handle assembly shaft (125) is movably disposed within the handle assembly (15). At least one effector assembly shaft (130) is movably disposed within the effector assembly (20). A coupler (455) is in coupling engagement the at least one handle assembly shaft (125) and the at least one effector assembly shaft (130). The at least one handle assembly shaft (125), at least one effector assembly shaft (130) and the scissor-handle-type mechanism (200) are configured such that, in use: opening the scissor-handle-type mechanism (200) into an open position (not shown) will bias the at least one handle assembly shaft (125), the coupler (455), and the at least one effector assembly shaft (130) each into a first position (not shown). Closing the scissor-handle-type mechanism (200) into a closed position (not shown) will bias the at least one handle assembly shaft (125), the coupler (455), and at least one effector assembly shaft (130) each into a second position (not shown). The at least one effector assembly shaft (130) and the grasping assembly (500) are operatively coupled such that, in use, when the at least one effector assembly shaft (130) is biased into the first position (not shown), the grasping assembly (500) is biased into an open releasing configuration (not shown) and when at least one effector assembly shaft (130) is biased into the second position (not shown), the grasping assembly (500) is biased into a closed grasping configuration (not shown).

Figure 20:
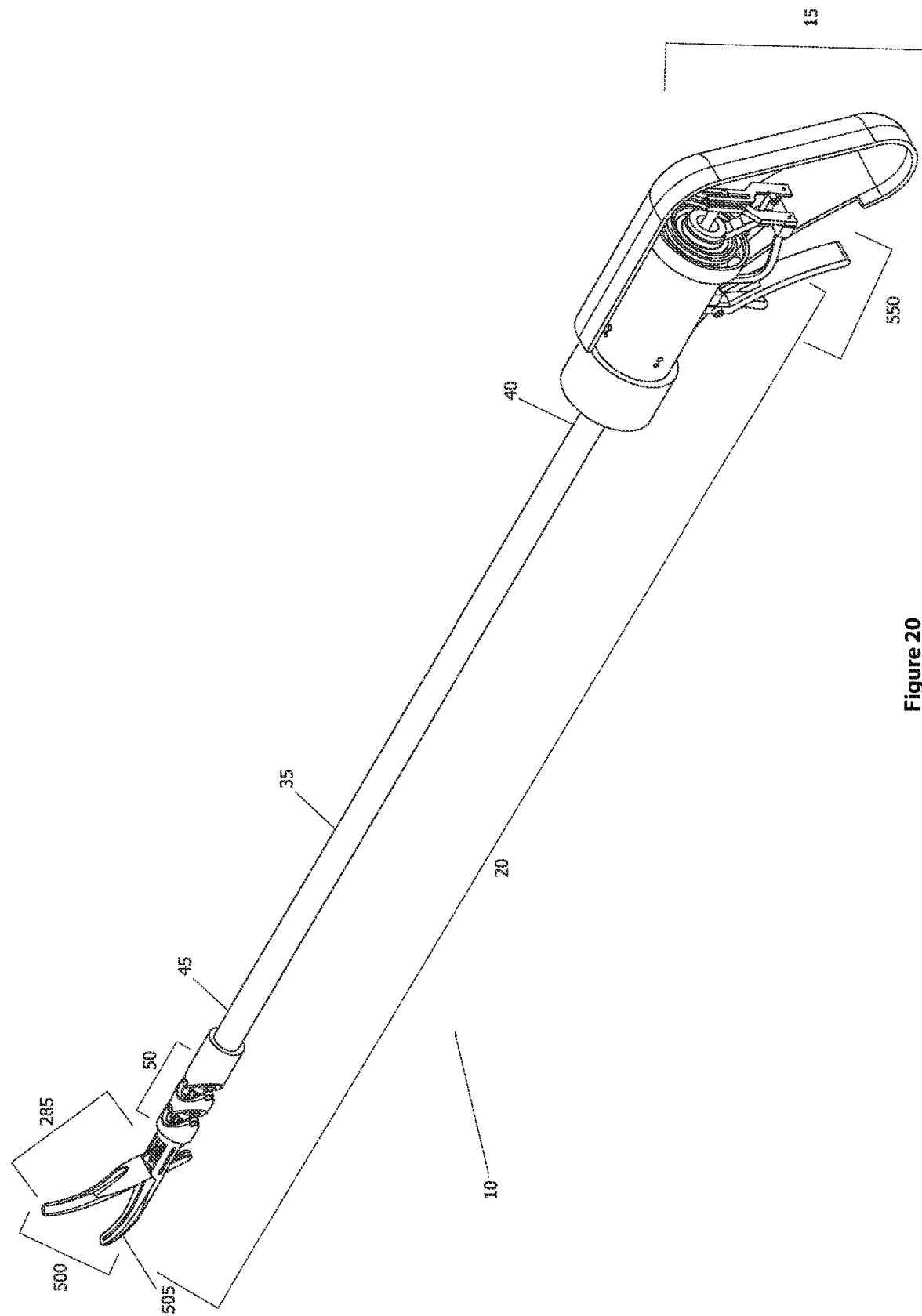
FIG. 20 an isometric view of another mechanically operated device according to the invention.
Figure 21:
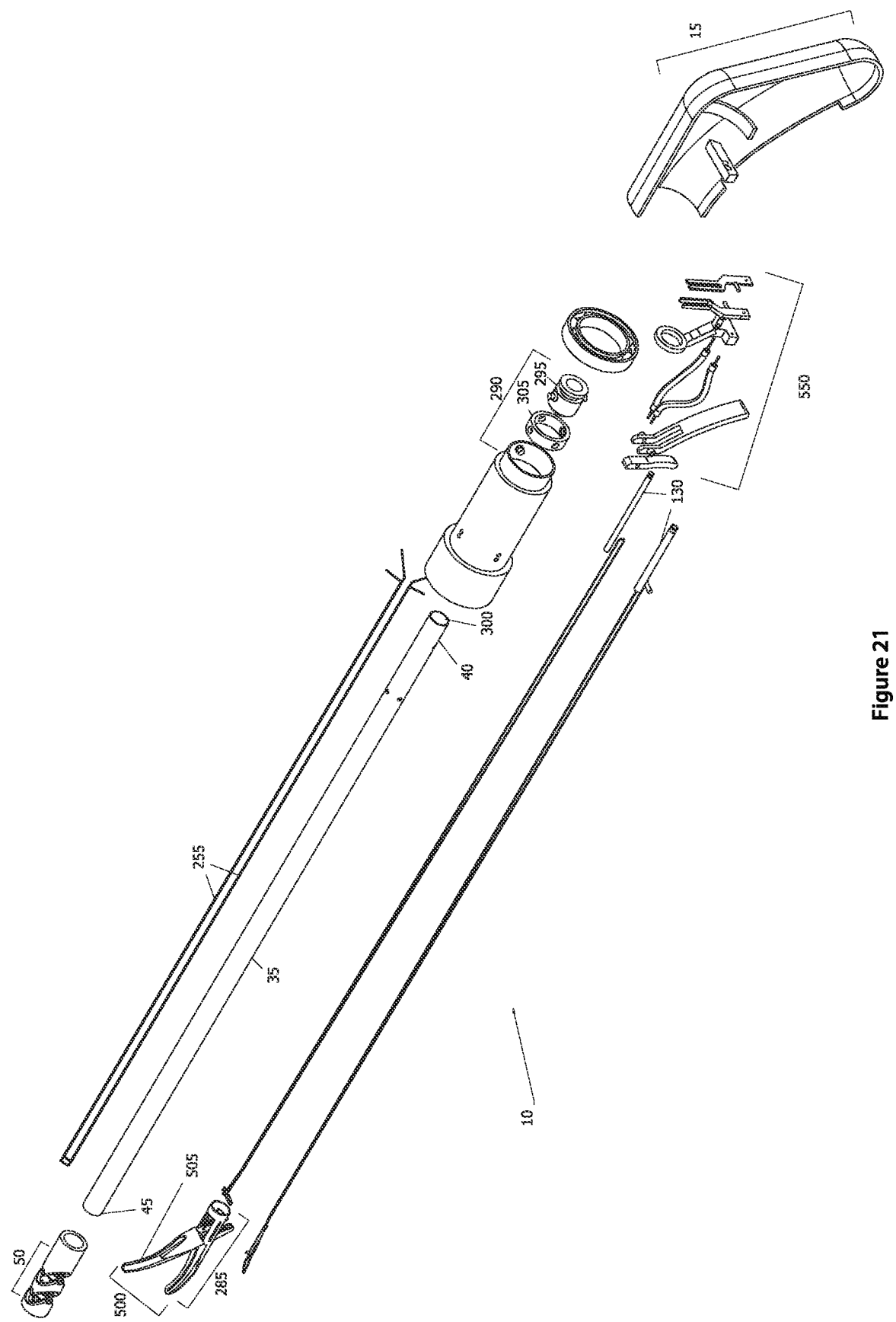
FIG. 21 is an exploded view of the mechanically operated device of FIG. 20.
Figure 22:
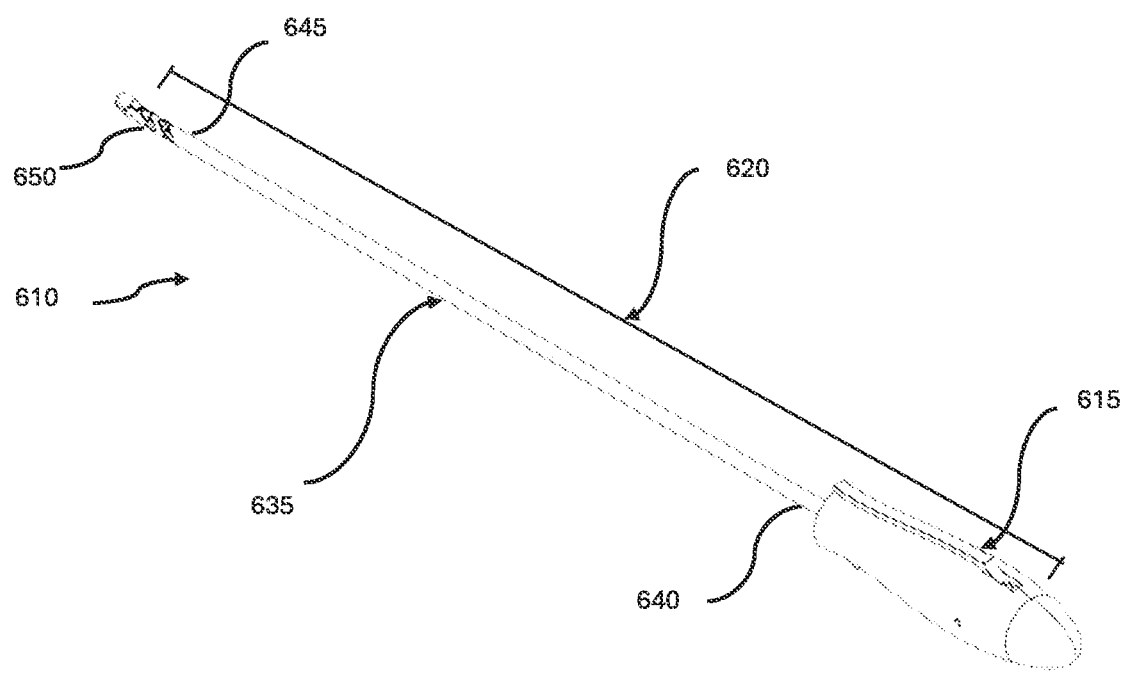
FIG. 22 is an isometric view of a mechanically operated device according to a further embodiment of the invention.
Figure 23:
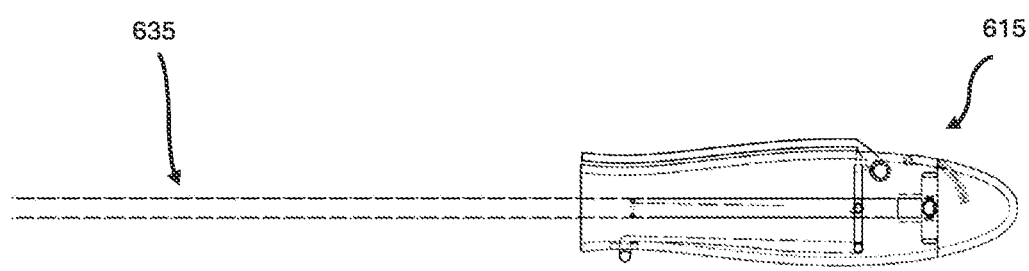
FIG. 23 is a schematic view of a portion of the device in FIG. 22.
Figure 24:
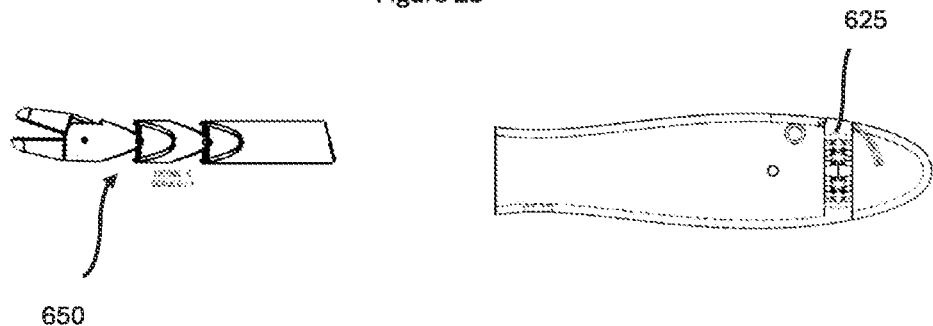
FIG. 24 is an isometric detailed view of elements including flexible kinematic chain and handle assembly.

As shown in FIGS. 20 and 21, the end effector controller (80) is a trigger mechanism located adjacent the handle assembly (15). The at least one handle assembly shaft (125) is movably disposed within the handle assembly (15). The at least one effector assembly shaft (130) is movably disposed within the effector assembly (20). The end effector (285) is a grasping assembly (500). The grasping assembly (500) includes at least one mobile grasping formation (505). The at least one handle assembly shaft (125), at least one effector assembly shaft (130), and trigger mechanism (550) are configured such that, in use: moving the trigger mechanism (550) into a first position (not shown) will bias the at least one handle assembly shaft (125), the coupler (455), and the at least one effector assembly shaft (130) each into a first position (not shown). Moving the trigger mechanism (550) into a second position (not shown) will bias the at least one handle assembly shaft (125), the coupler (455), and at least one effector assembly shaft (130) each into a second position (not shown). The at least one effector assembly shaft (130) and the grasping assembly (500) are operatively coupled such that, in use, when the at least one effector assembly shaft (130) is biased into the first position (not shown), the grasping assembly (500) will be biased into an open releasing configuration (not shown). When the at least one effector assembly shaft (130) is biased into the second position (not shown), the grasping assembly (500) is biased into a closed grasping configuration (not shown).

As shown in FIGS. 9, 10, 14, and 15, the mechanically operated device (10) includes a scissor-handle-type mechanism (200) located adjacent the handle assembly (15). At least one handle assembly shaft (125) is movably disposed within the handle assembly (15). At least one effector assembly shaft (130) is movably disposed within the effector assembly (20). The end effector (285) includes a grasping assembly (500). The grasping assembly (500) includes at least one mobile grasping formation (505). The at least one handle assembly shaft (125), at least one effector assembly shaft (130), and the scissor-handle-type mechanism (200) is configured such that, in use: opening the scissor-handle-type mechanism (200) into an open position (not shown) will bias the at least one handle assembly shaft (125), the coupler (455), and the at least one effector assembly shaft (130) each into a first position (not shown). Closing the scissor-handle-type mechanism (200) into a closed position (not shown) will bias the at least one handle assembly shaft (125), the coupler (455), and at least one effector assembly shaft (130) each into a second position (not shown). The at least one effector assembly shaft (130) and the grasping assembly (500) are operatively coupled such that, in use, when the at least one effector assembly shaft (130) is biased into the first position (not shown), the grasping assembly (500) is biased into an open releasing configuration (not shown) and when at least one effector assembly shaft (130) is biased into the second position (not shown), the grasping assembly (500) is biased into a closed grasping configuration (not shown).

In some embodiments, the coupler (455) will include one or more Bowden cable(s). The one or more Bowden cable(s) are fixedly coupled to the at least one handle assembly shaft (125) and one effector assembly shaft (130) by one or more collars (540).

It will be appreciated that other embodiments of the invention can include a plurality of handle assembly shafts and a plurality of effector assembly shafts configured to integrate relevant movements.

Figure 35:
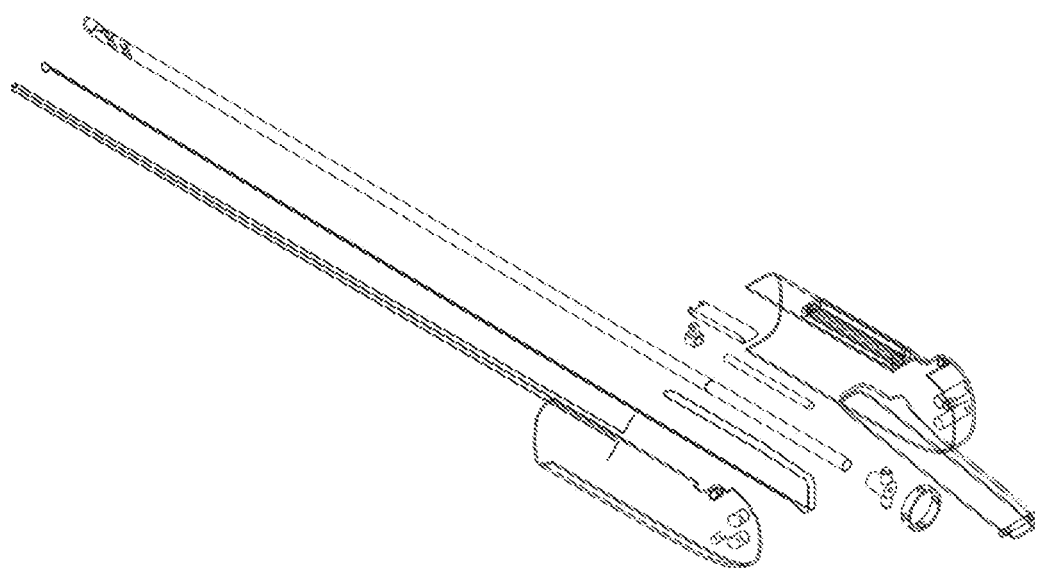
FIG. 35 is an exploded view of the device in FIG. 22.
Figure 36:
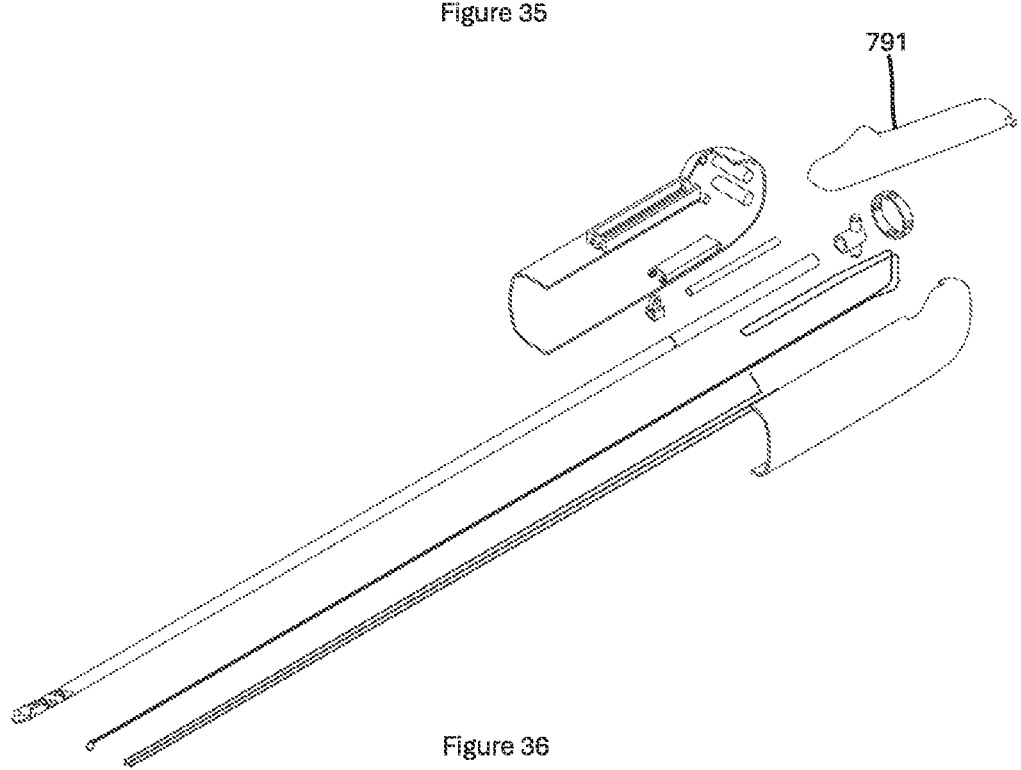
FIG. 36 is an exploded view of the device in FIG. 22 from different perspective.

FIGS. 22-36 disclose further preferred embodiments of the mechanically operated device of the invention (610). The mechanically operated device (610) has a handle assembly (615) (see FIGS. 35 and 36) sized and shaped for grasping by a user (not shown) and an effector assembly (620). The handle assembly has an actuator (625) tiltable about a point (not shown). The effector assembly includes a tubular member (635), the tubular member (635) has a first end (640) positioned proximal to the actuator (625).

A flexible kinematic chain (650) is positioned at a second end (645) of the tubular member (635). A plurality of primary connecting cables (655) is coupled to the handle assembly (615) and at least a first part of the flexible kinematic chain (650). Each of the plurality of primary connecting cables (655) is guided at least though a lumen of the tubular member (635) and at least partially through the flexible kinematic chain (650). The handle assembly (615) is configured to impart translational motion to each of the plurality of connecting cables (655) and, in use, reciprocally displace at least one connecting cable (655) along a longitudinal axis of the effector assembly and thereby enable movement of at least a first part (660) of the flexible kinematic chain (650).

Figure 25:
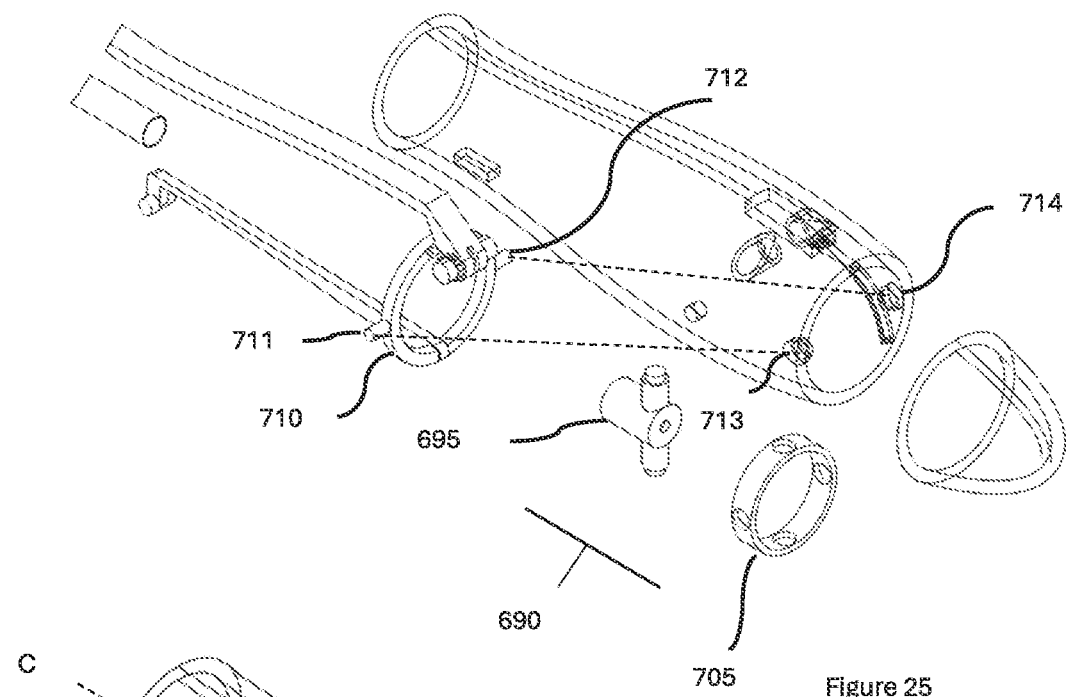
FIG. 25 is an exploded view of the handle assembly of FIG. 24.
Figure 26:
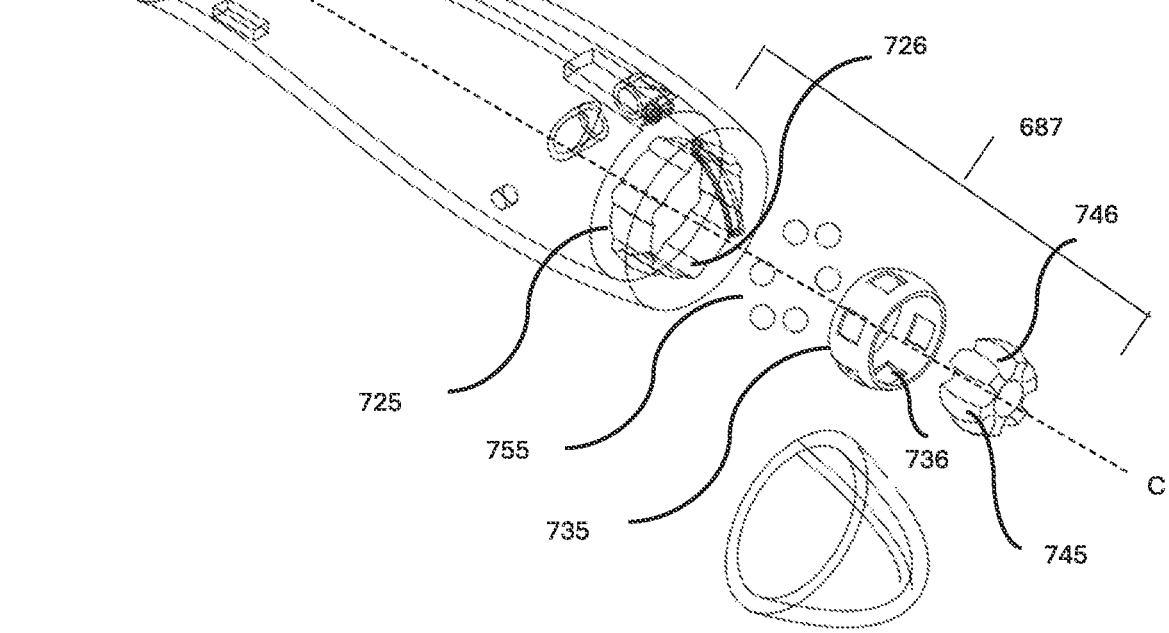
FIG. 26 is an exploded view of the handle assembly of FIG. 24 with ball bearing joint.
Figure 27:
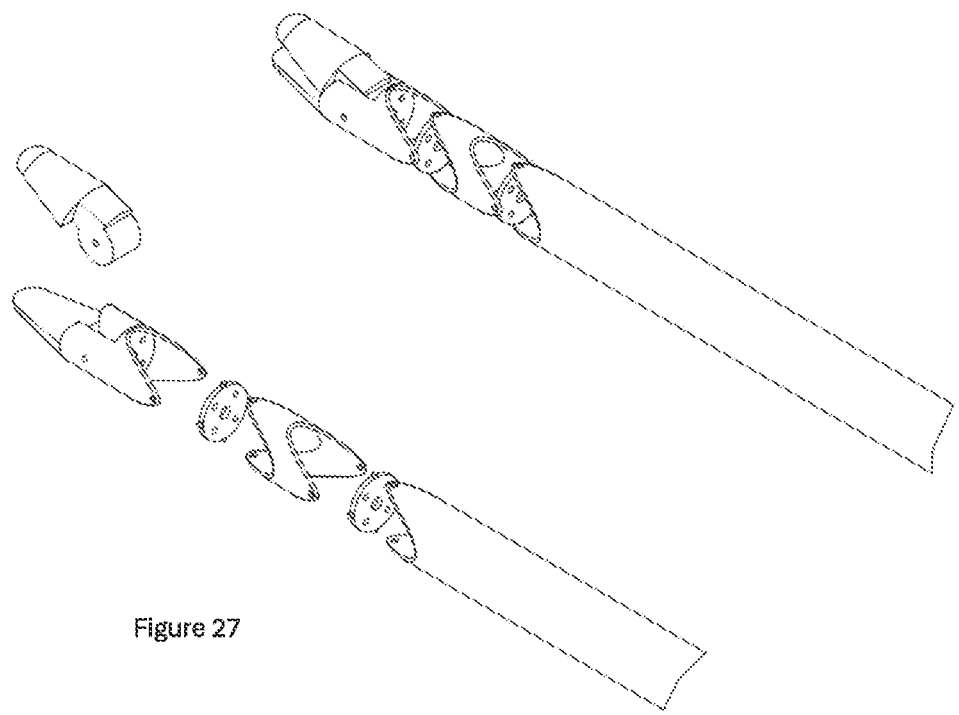
FIG. 27 is a detailed view of the kinematic chain of the device.
Figure 28:
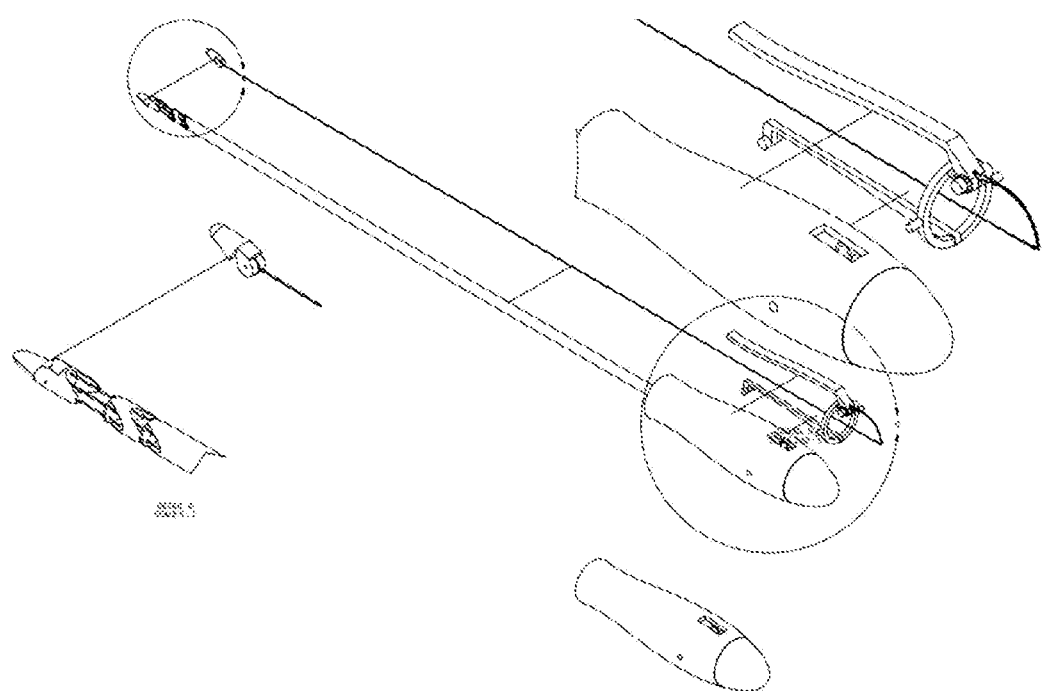
FIG. 28 is a schematic view of the device of FIG. 22 showing handle in exploded view.
Figure 29:
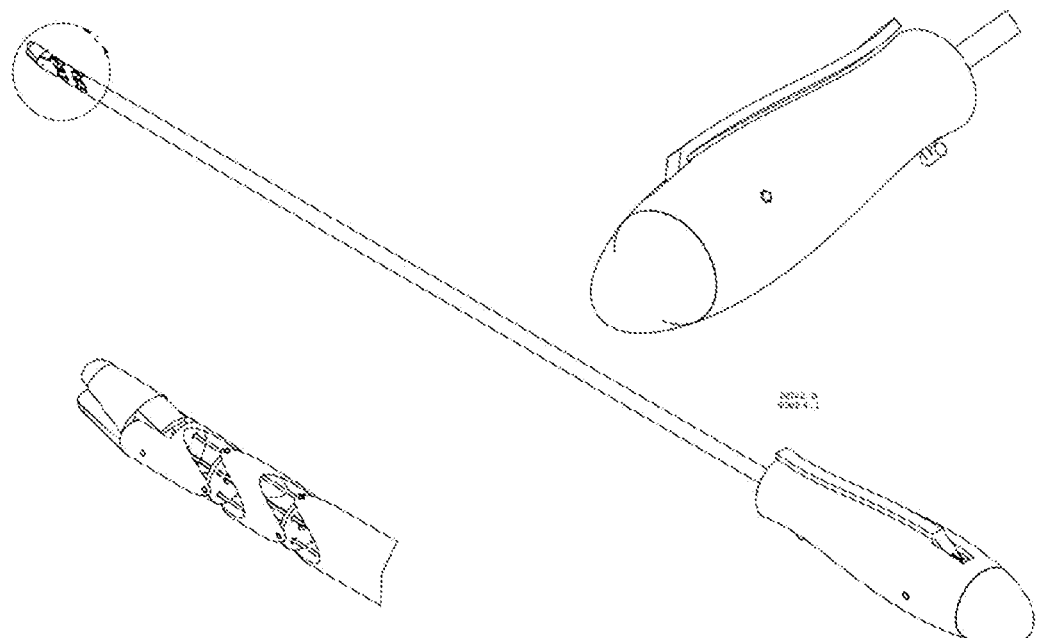
FIG. 29 is a close up view of kinematic chain and handle of the device in FIG. 22.
Figure 30:
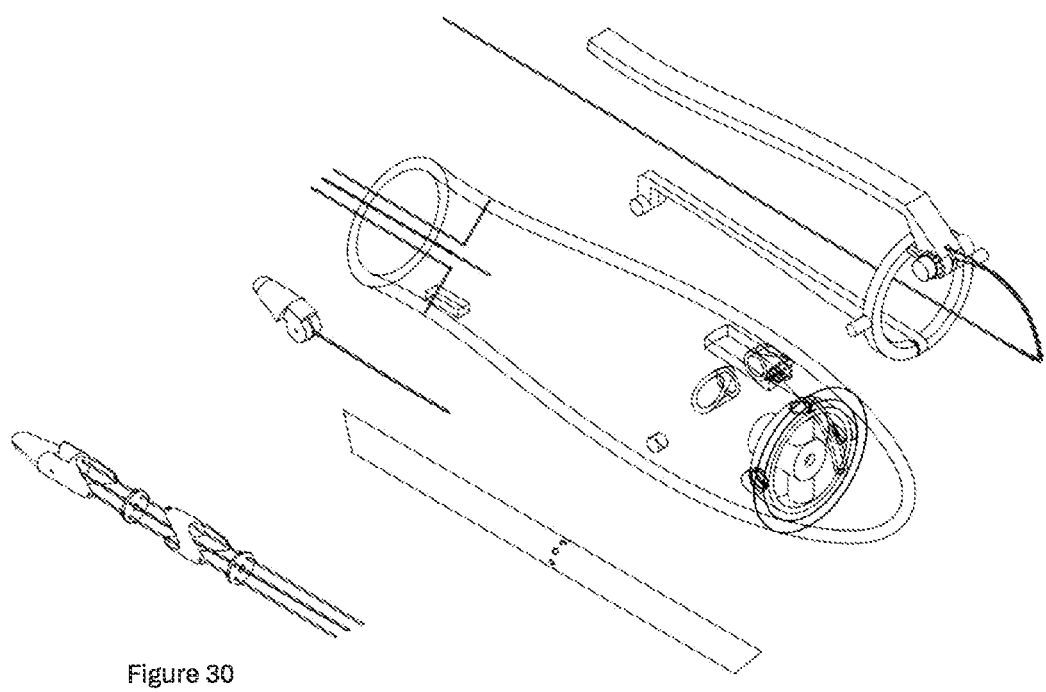
FIG. 30 is an exploded view of components of the device according to FIG. 22.
Figure 31:
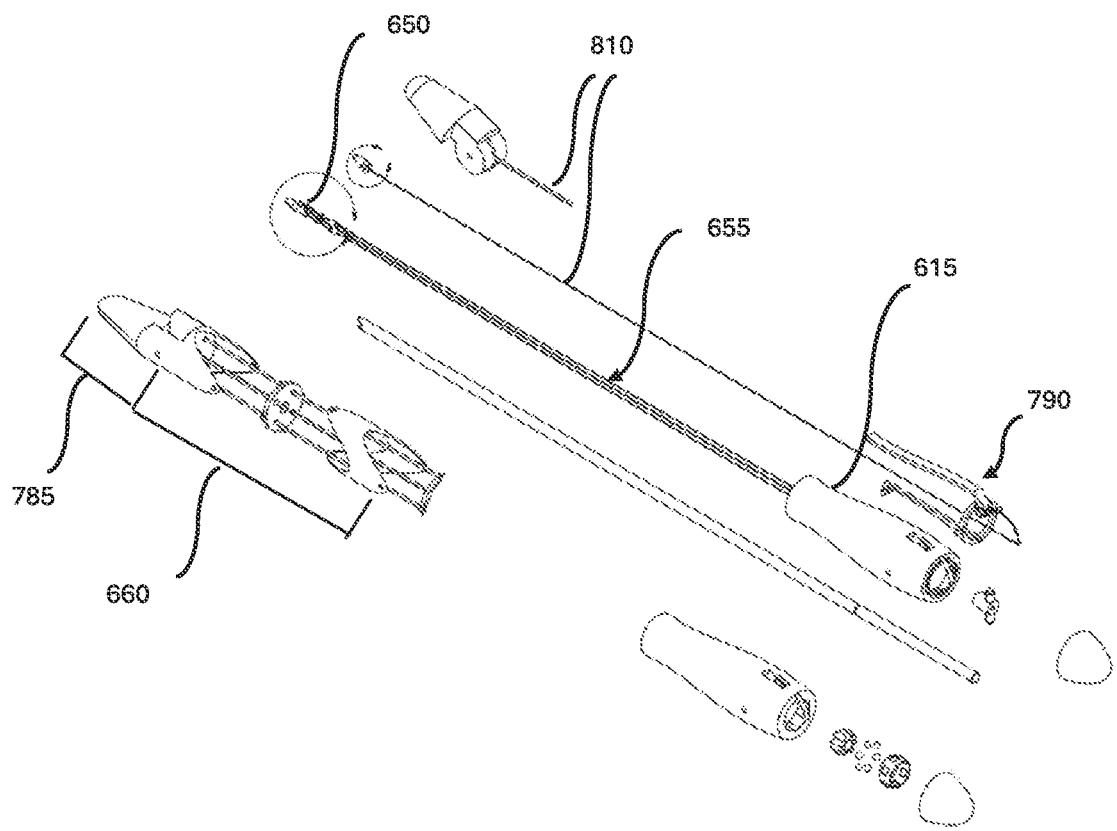
FIG. 31 is an exploded view of components of the device according to FIG. 26.
Figure 32:
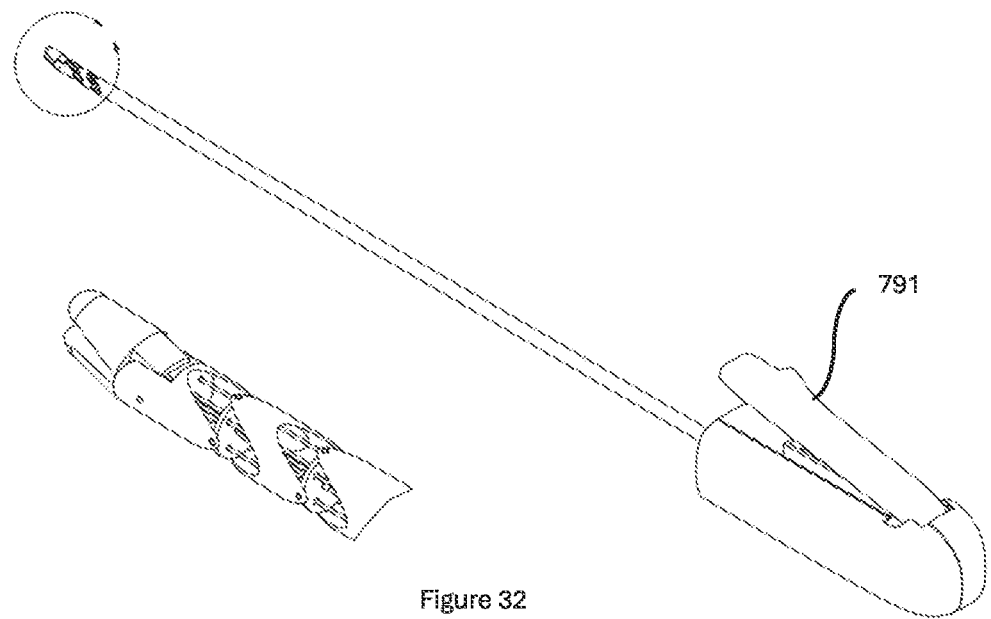
FIG. 32 is a view of FIG. 29 from a different perspective.
Figure 33:
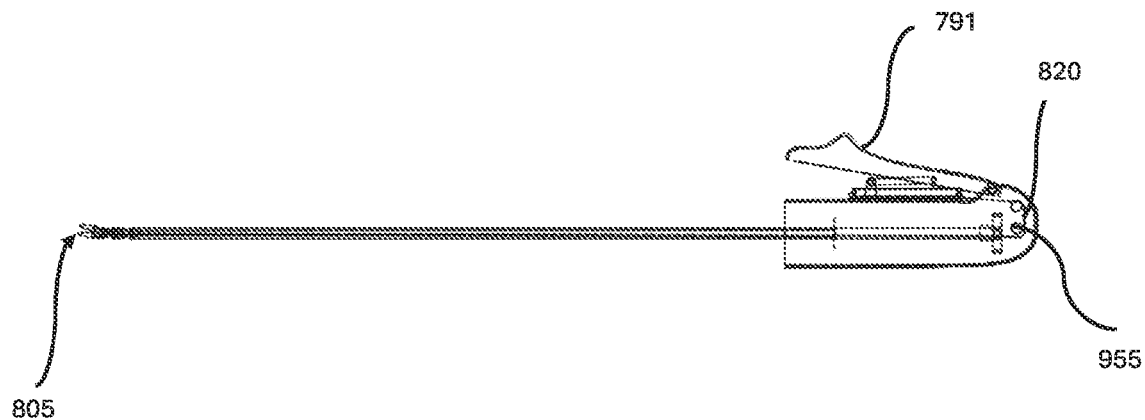
FIG. 33 is a side view of the device in FIG. 22 showing internals of handle assembly.
Figure 34:
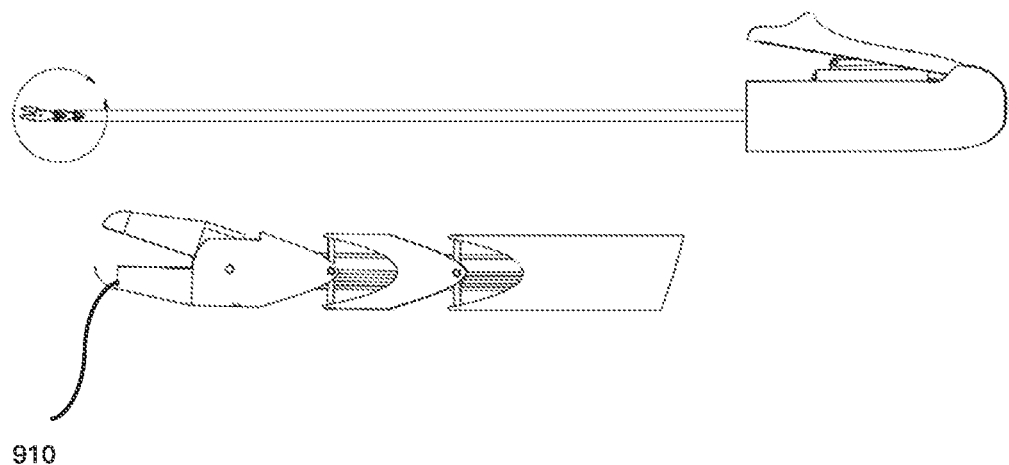
FIG. 34 is a close up view of grasping formation/assembly and handle effector.

Referring to FIG. 25, the effector assembly includes a gyroscope (690) which includes an inner gimbal (695), a middle gimbal (705) and an outer gimbal (710). The outer gimbal (710) is rotatably mounted to the middle gimbal (705), and the middle gimbal (705) is rotatably mounted to the inner gimbal (695). The inner gimbal (695), middle gimbal (705), and the outer gimbal (710) are arranged to in two orthogonal directions. The inner gimbal (695) is configured to engage the first end of the tubular member (635). The outer gimbal is configured to engage the handle assembly.

In another embodiment (see FIG. 26), the gyroscope is replaced by a ball bearing joint (687) that is tillable around a point. The joint includes an outer ring (725), a middle ring (735), an inner ring (745) and a plurality of ball bearings (755). The outer (725), middle (735) and inner (745) ring have surfaces that are curved around a centre point in the longitudinal direction in a configuration of sectioned spherical surface. The outer ring and the inner ring surfaces include multiple grooves (726 and 746). The middle ring includes multiple windows (736). The plurality of ball bearings (755) is located between the grooves (726 and 746) of the outer ring (725) and middle ring (735) and maintained in position by the windows (736) in the middle ring (735) which functions as a guide.

The outer ring (725) is configured to engage the handle assembly by mating engagement between spigots 711 and 712 with internal bores 713 and 714 within the handle assembly respectively. The inner ring (745) is configured to engage the first end (640) of the tubular member (620).

The handle assembly (615) is adapted to be rotatable about a longitudinal axis C-C of the handle assembly. The effector assembly (620) is configured to rotate about a longitudinal axis of the effector assembly (620). The longitudinal axis of the handle assembly (C-C) and longitudinal axis of the effector assembly (620) is substantially identical.

The handle assembly (615) is operatively coupled to the effector assembly (620). such that, in use, rotational motion of the handle assembly (615) about the longitudinal axis (C-C) of the handle is transmitted to the effector assembly (620), thereby to effect rotational motion of the effector assembly (620) about the longitudinal axis (C-C) of the effector assembly (620).

The mechanically operated device (610) includes an end effector (785) coupled to a distal end of the flexible kinematic chain (650) and an end effector controller (790), which is pivotally engaged to the handle assembly (615) and configured to be engaged by at least part of a hand of the user (not shown). The end effector controller (790) is operatively coupled to the end effector (785).

The end effector (785) includes at least one grasping formation (805). The end effector controller (790) is operatively coupled to the end effector (685) by an actuator drive element such as a cable means (810) such that, in use, movement of the end effector controller (790) causes a corresponding relative movement of the at least one grasping formation (805).

The end effector controller (790) includes at least one handle actuator (791) having at least one handle actuator drive element (820) in the form of a cable. The end effector (785) includes at least one grasping formation (805) having at least one grasping formation drive element (910).

At least one loop of flexible material (810) passes at least partially over the at least one handle actuator drive element (820). The at least one loop of flexible material extends from the at least one handle actuator drive element (820) through at least the tubular member (635) and through the flexible kinematic chain (650) and passes at least partially over the at least one grasping formation drive element (910).

The at least one loop of flexible material (810) is configured, in use, to transmit a first force generated by a movement of the at least one handle actuator drive element from a first position of the at least one handle actuator drive element (820) to a second position (not shown) of the at least one handle actuator drive element (820) to the at least one grasping formation drive element (910) such that, in use, a second force may be transmitted to the at least one grasping formation drive element (910) thereby to move the at least one grasping formation (805) from a first position (not shown) of the at least one grasping formation to a second position (not shown) of the at least one grasping formation (805).

The end effector controller (790) in one embodiment can be spring loaded (not shown) to allow a passive return to a pre-set position. The handle assembly includes a locking mechanism which comprises a ratchetted rim on the handle actuator drive element, a locking pin, a coupling mechanism and an actuator.

The Locking mechanism is configured such that when engaged it keeps the end effector biased in a closed position. As shown in FIGS. 32-36, the mechanically operated device includes the end effector controller (790) located adjacent the handle assembly (615). At least one handle assembly slider (955) is movably disposed within the handle assembly (615). The end effector (725) includes a grasping assembly (805). The grasping assembly (805) includes at least one mobile grasping formation (910). At least one loop of flexible material (810) functionally linked to the at least one handle assembly slider.

The at least one loop of flexible material (810) extends from the at least one handle slider (955) through at least the lumen of the tubular member (635) and through the flexible kinematic chain (650) and passes at least partially over the at least one grasping formation drive element (910). The at least one handle assembly slider (955), at least one loop of flexible material, at least one mobile grasping formation (910), and the end effector controller (790) is configured such that, in use: moving the end effector controller (790) into an open position (not shown) will bias the at least one handle assembly slider (955), and the at least one grasping formation (910) each into a first position (not shown). Moving the end effector controller (790) into a closed position (not shown) will bias the at least one handle assembly slider (955), and at least one mobile grasping formation (910) each into a second position (not shown). The end effector controller can be spring loaded (not shown) to allow passive return to a pre-set position. The handle assembly in this embodiment can include a locking mechanism (not shown), which is configured to keep the mechanism in closed position when engaged.

There is also disclosed methods of using the mechanically operated devices disclosed hereinbefore. Such methods may be minimally invasive surgical procedures that may include, for example, arthroscopy, endoscopy, laparoscopy, stereotactic surgery, and vascular surgery. A person skilled in the art will appreciate that the mechanically operated device and methods of using such a mechanically operated device can also readily be used in open surgical procedures.

Example: A Surgical Procedure

In this example, two mechanically operated devices configured as laparoscopic surgical devices are used. One of the mechanically operated devices is configured as a non-ratcheting grasper having two mobile jaws. The other mechanically operated device is configured as a ratcheting grasper having two mobile jaws, which allows the mobile jaws to be locked in a preferred position. The non-ratcheting grasping device will pass suture knots to the ratcheting grasper that acts as a needle driver. The surgeon will use both mechanically operated devices to effectively suture a lesion in a patient's tissue as mimicking the surgeon's movements the sutures are applied. Typically, the positioning of the graspers is configured to facilitate the physiologic motion of the surgeon, i.e., preferably toward the surgeon's midline and easily mimicking the surgeon's movements. A person skilled in the art will understand the positioning of the relevant graspers relative the tip and hub of the needle during the process of laparoscopic suturing and tying of a suture knot. Accordingly, the positioning and tying steps will not be discussed further here.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures, or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the description provided herein, numerous specific details are set forth. It is, however, understood that embodiments of the invention may be practiced without these specific details. In other instances, well-known methods, structures, and techniques have not been shown in detail in order not to obscure an understanding of this description.

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

In the claims which follow and in the preceding description of the invention, except where the context requires otherwise due to express language or necessary implication, the word "comprise" or variations such as "comprises" or "comprising" are used in an inclusive sense, i.e., to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The terminology used in this application is for the purpose of describing particular embodiments/applications only and is not intending to be limiting the invention or its application. The use of the terms 'component', 'contains', 'containing', 'comprise' or 'comprising' specify the presence of stated features, steps, operations or components, but do not preclude the minor modification of individual components of the device to fulfil the same purpose, nor does it preclude the addition of features, steps, operations or components to enhance the application of this device in managing positive margins/inoperable tumours.

Unless otherwise defined, all terms (including technical and scientific terms) used herein have the same meaning as commonly understood by those having ordinary skill in the area in which this invention belongs. Terms should be interpreted as having a meaning which is consistent to their dictionary definition, or as understood by a reasonable qualified person having an understanding of such concepts within the field of invention.

It is apparent from the above, that the arrangements described are applicable to the fields of medicine and mechanically operated surgical devices for use in minimal invasive surgery.

I claim:

1. A mechanically operated device comprising:
   a handle assembly sized and shaped for grasping by a user;
   an effector assembly, the effector assembly including:
      a first primary actuator tiltable about a first point;
      a second primary actuator tiltable about a second point;
   a primary gyroscope having:
      a primary inner gimbal;
      a primary middle gimbal; and
      a primary outer gimbal;
      wherein the primary gyroscope is rotatable relative to and adjacent the second primary actuator;
   a tubular member, the tubular member having a first end positioned proximal to the second primary actuator;
   a flexible kinematic chain, the flexible kinetic chain positioned at a second end of the tubular member; and
   a plurality of primary connecting cables coupled to the second primary actuator and at least a first part of the kinematic chain, each primary connecting cable guided at least though a lumen of the tubular member and at least partially through the flexible kinematic chain;

wherein the first primary actuator is configured to displace the second primary actuator thereby to impart translational motion to each primary connecting cable and, in use, reciprocally displace at least one primary connecting cable along a longitudinal axis of the at least one primary connecting cable and thereby enable movement of the at least first part of the flexible kinematic chain.

2. The mechanically operated device according to claim 1, wherein:
the primary outer gimbal is rotatably mounted to the primary middle gimbal; and
the primary middle gimbal is rotatably mounted to the primary inner gimbal; and
wherein the primary inner gimbal is configured to engage the first end of the tubular member.

3. The mechanically operated device according to claim 1, wherein the primary inner gimbal, primary middle gimbal, and the primary outer gimbal rotate in two orthogonal directions.

4. The mechanically operated device according to claim 1, the effector assembly further including:
a first secondary actuator tiltable about a third point;
a second secondary actuator tiltable about a fourth point;
a plurality of secondary connecting cables coupled to the second secondary actuator and at least a second part of the kinematic chain, each secondary connecting cable guided at least though the lumen of the tubular member and the at least second part of the flexible kinematic chain; and
wherein the first secondary actuator is configured to displace the second secondary actuator thereby to impart translational motion to each secondary connecting cable and, in use, reciprocally displace at least one secondary connecting cable along a longitudinal axis of the at least one secondary connecting cable and thereby enable movement of the at least second part of the flexible kinematic chain.

5. The mechanically operated device according to claim 4, wherein a secondary gyroscope having:
a secondary inner gimbal;
a secondary middle gimbal; and
a secondary outer gimbal;
is rotatable relative to and adjacent the second secondary actuator.

6. The mechanically operated device according to claim 5, wherein:
the secondary outer gimbal is rotatably mounted to the secondary middle gimbal; and
the secondary middle gimbal is rotatably mounted to the secondary inner gimbal.

7. The mechanically operated device according to claim 5, wherein the secondary inner gimbal; secondary middle gimbal; and the secondary outer gimbal rotate in two orthogonal directions.

8. The mechanically operated device according to claim 5, wherein the first secondary actuator rotatably engages the second secondary actuator.

9. The mechanically operated device according to claim 5, wherein the handle assembly is operatively coupled to the effector assembly; and wherein the handle assembly includes a driver, and the effector assembly includes a follower, the driver operatively coupled to the follower such that, in use, rotational motion of the handle assembly about the first longitudinal axis is transmitted to the effector assembly thereby to effect rotational motion of the effector assembly about the longitudinal axis of the effector assembly.

10. The mechanically operated device according to claim 1, further comprising an end effector coupled to a distal end of the kinematic chain; wherein the handle assembly rotatably engages an end effector controller; and wherein the end effector controller is operatively coupled to the end effector.

11. The mechanically operated device according to claim 10, wherein:
the end effector controller is a scissor-handle-type mechanism located adjacent the handle assembly; and
the end effector includes at least one grasping formation;
the scissor-handle-type mechanism is operatively coupled to the end effector such that, in use, movement of the scissor-handle-type mechanism effects a movement of the at least one grasping formation.

12. The mechanically operated device according to claim 11, wherein:
the scissor-handle-type mechanism includes at least one handle actuator having at least one handle actuator drive element;
the end effector includes at least one grasping formation having at least one grasping formation drive element;
at least one loop of flexible material:
passes at least partially over the at least one handle actuator drive element;
extends from the at least one handle actuator drive element through at least the lumen of the tubular member and through the flexible kinematic chain; and
passes at least partially over the at least one grasping formation drive element;
wherein, the at least one loop of flexible material is configured, in use:
to transmit a first force generated by a movement of the at least one handle actuator drive element from a first position of the at least one handle actuator drive element to a second position of the at least one handle actuator drive element to the at least one grasping formation drive element such that, in use, a second force is transmitted to the at least one grasping formation drive element thereby to move the at least one grasping formation from a first position of the at least one grasping formation to a second position of the at least one grasping formation.

13. The mechanically operated device according to claim 11, further comprising:
at least one handle assembly shaft movably disposed within the handle assembly;
at least one effector assembly shaft movably disposed within the effector assembly;
a coupler in coupling engagement the at least one handle assembly shaft and the at least one effector assembly shaft;
wherein the at least one handle assembly shaft, at least one effector assembly shaft, and the scissor-handle-type mechanism are configured such that, in use:
opening the scissor-handle-type mechanism into an open position biases the at least one handle assembly shaft, the coupler, and the at least one effector assembly shaft each into a first position; and
closing the scissor-handle-type mechanism into a closed position biases the at least one handle assembly shaft, the coupler, and at least one effector assembly shaft each into a second position, and wherein the at least one effector assembly shaft and the grasping assembly are operatively coupled such that, in use,
  when the at least one effector assembly shaft is biased into the first position, the grasping assembly is biased into an open releasing configuration; and
  when at least one effector assembly shaft is biased into the second position, the grasping assembly is biased into a closed grasping configuration.

14. The mechanically operated device according to claim 11, wherein:
  the end effector controller is a trigger mechanism located adjacent the handle assembly;
  the at least one handle assembly shaft is movably disposed within the handle assembly;
  the at least one effector assembly shaft is movably disposed within the effector assembly;
  the end effector comprises a grasping assembly, the grasping assembly includes at least one mobile grasping formation, and wherein the at least one handle assembly shaft, at least one effector assembly shaft, and trigger mechanism are configured such that, in use:
  moving the trigger mechanism into a first position biases the at least one handle assembly shaft, the coupler, and the at least one effector assembly shaft each into a first position; and
  moving the trigger mechanism into a second position biases the at least one handle assembly shaft, the coupler, and at least one effector assembly shaft each into a second position, and wherein the at least one effector assembly shaft and the grasping assembly are operatively coupled such that, in use,
  when the at least one effector assembly shaft is biased into the first position, the grasping assembly is biased into an open releasing configuration; and
  when at least one effector assembly shaft is biased into the second position, the grasping assembly is biased into a closed grasping configuration.

\* \* \* \* \*